(12) United States Patent
Enos

(10) Patent No.: US 12,392,315 B1
(45) Date of Patent: Aug. 19, 2025

(54) UNDERWATER KINETIC FLOW SYSTEMS AND METHODS FOR GENERATING HYDROELECTRIC ENERGY

(71) Applicant: Hydrocean, Inc, San Diego, CA (US)

(72) Inventor: Christopher Enos, San Diego, CA (US)

(73) Assignee: Hydrocean, Inc, San Diego, CA (US)

(*) Notice: Subject to any disclaimer, the term of this patent is extended or adjusted under 35 U.S.C. 154(b) by 0 days.

(21) Appl. No.: 19/197,422

(22) Filed: May 2, 2025

Related U.S. Application Data

(63) Continuation of application No. PCT/US2025/014866, filed on Feb. 6, 2025.

(60) Provisional application No. 63/551,507, filed on Feb. 8, 2024.

(51) Int. Cl.
F03B 17/06 (2006.01)

(52) U.S. Cl.
CPC ................... *F03B 17/06* (2013.01)

(58) Field of Classification Search
CPC ...................................... F03B 17/06
See application file for complete search history.

(56) References Cited

U.S. PATENT DOCUMENTS

2007/0257493 A1  11/2007  Alstot et al.
2015/0198057 A1* 7/2015  Hanna .................... F01D 15/10
                                              290/52
2021/0404434 A1  12/2021  Kloster et al.

FOREIGN PATENT DOCUMENTS

ES        1219868 Y      1/2019

OTHER PUBLICATIONS

International Seach Report and Written Opinion issued in corresponding patent application No. PCT/US2025/014866, dated Apr. 10, 2025, in 17 pages.

* cited by examiner

*Primary Examiner* — Viet P Nguyen
(74) *Attorney, Agent, or Firm* — KNOBBE, MARTENS, OLSON & BEAR, LLP

(57) ABSTRACT

Systems, devices, and methods for creating a kinetic flow of water for generating hydroelectric energy are disclosed. The energy generation system can be located in a body of water, such as an ocean location. The energy generation system can include an inlet manifold, a turbine assembly that communicates a kinetic flow to one or more turbines, a chamber having an air void that receives the kinetic flow, and an exhaust system that expels water from the chamber maintaining the air void in the chamber. Water flowing through the turbine assembly and into the chamber the kinetic potential to power the turbine(s). The used water flow can be returned to the ambient water supply. In some implementations, power to empty water in the chamber can be extracted from the mechanical motion of the surface waves and converted to pneumatic power.

20 Claims, 10 Drawing Sheets

UNDERWATER KINETIC FLOW SYSTEMS AND METHODS FOR GENERATING HYDROELECTRIC ENERGY

INCORPORATION BY REFERENCE TO ANY PRIORITY APPLICATIONS

This application is a bypass continuation of International Application No. PCT/US2025/014866, having an International filing date of Feb. 6, 2025, and which claims priority to U.S. Provisional Application No. 63/551,507, filed Feb. 8, 2024. Each of the above-referenced applications are incorporated by reference herein in its entirety. Any and all applications for which a foreign or domestic priority claim is identified in the Application Data Sheet as filed with the present application are hereby incorporated by reference under 37 CFR 1.57.

FIELD OF THE INVENTION

Embodiments of the present application are directed to methods, systems, and devices for generating energy in a body of water, such as an ocean, using an underwater kinetic flow to operate a turbine.

BACKGROUND

Energy is an ever-increasing need in modern society. Energy generation systems, methods, and devices that deliver clean, renewable energy able to meet demands at locations all around the world is desirable. Flowing water is a steadfast energy source that can be easily converted to energy generation with advantages not available to other renewable sources. Locating a hydroelectric generation system offshore removes many of the environmental concerns that other hydroelectric generation methods cause, such as impacting marine life, the ecological issues of damming rivers, or the vast spaces typically needed for oceanic energy sources that utilize tides, waves, or currents as an input to energy generation.

Embodiments of the present disclosure can advantageously address these and other drawbacks. Since kinetic flows of water utilize vertical space, the area needed for systems, methods, and devices according to the present disclosure can be kept to a minimum, thereby minimizing ecological impacts. Creating a kinetic flow system that uses the ocean environment as a reservoir, as opposed to a lake or river, offers many advantages in terms of sheer volume and capacity. Also, returning the used water to the available reservoir can create an unlimited resource from which to extract power.

SUMMARY

Embodiments of systems and methods relate to generating hydroelectric energy in a body of water. Such embodiments utilize a moving column of water, which may be referred to herein as a kinetic flow of water ("kinetic flow") or an "underwater waterfall," that drives a hydroelectric turbine, where the column of water continuously moves towards and into an air-filled volume (a "void") in a chamber which is positioned underwater, below the column of water, and the movement of the column of water downward to the chamber powers the turbine. During energy generation, water received in the chamber is continuously emptied by an exhaust system such that the void is maintained at all times. That is, the chamber is at least partially filled with air during energy generation allowing water to continuously flow through the turbine, driving the turbine, and into the chamber. Embodiments of the present disclosure leverage the availability of depths of water to create a reliable, steady, and continuous source of power, with minimal or no negative impact to the surrounding environment. Creating an underwater kinetic flow in the ocean can allow nearly any coastal area to become a hydroelectric generation site, thus creating a grid-scale renewable energy device as well as providing a stand-alone renewable energy supply for offshore and coastal locations. Embodiments of the present disclosure are described in the context of systems and devices located in an ocean environment, but it will be understood that the present disclosure can be suitably implemented in other environments and bodies of water.

One innovation includes a system for generating hydroelectric energy underwater. The energy system can comprise a turbine assembly having a proximal end and a distal end, the turbine assembly comprising a conduit having a fluid channel structured to communicate water extending between the proximal end and the distal end of the turbine assembly, and one or more hydroelectric turbines positioned within the conduit, the one or more turbines driven by water flowing through the conduit and into and through the turbine assembly. The energy system further comprises an intake manifold having one or more openings and coupled to the proximal end of the turbine assembly, the intake manifold structured to communicate fluid received through the one or more openings to the turbine assembly, a chamber coupled to the distal end of the turbine assembly, the chamber structured to receive water flowing through the turbine assembly, an exhaust system coupled to the chamber and in fluid communication with the chamber, the exhaust system configured to remove water from the chamber, and a control system operatively connected to the exhaust system. The exhaust system can include one or more discharge systems each having a cavity, the one or more discharge systems comprising a first discharge system having a first cavity, the first discharge system being configured to receive water from the chamber into the first cavity and then discharge the water in the first cavity. The system is structured to be placed in an operating position underwater and aligned such that the proximal end of the turbine assembly is positioned higher than the distal end of the turbine assembly, such that a column of water is formed from the inlet manifold to the distal end of the turbine assembly. Prior to the start of energy generation, the chamber contains air (a void). When energy generation starts, the column of water flows into the chamber. The control system is configured to operate the exhaust system to remove water from the chamber to maintain at least some air in the chamber such that water continuously flows through the turbine assembly and into the chamber. For example, the control system is configured to remove water from the chamber at a first rate that is about the same, or faster than, a second rate of water flowing into the chamber from the turbine assembly.

Various embodiments and examples of such systems can include other components and features. In some embodiments, the one or more hydroelectric turbines are positioned at the distal end of the turbine assembly. In some embodiments, the one or more hydroelectric turbines comprises at least two hydroelectric turbines. In some embodiments, the one or more discharge systems of the exhaust system includes a second discharge system having a second cavity, the second discharge system structured to receive water from the chamber into the second cavity and discharge the water from the second cavity. The exhaust system can further include a compressed air system for generating compressed air, and a plurality of channels and a plurality of valves arranged for providing the compressed air to operate the exhaust system. The compressed air system can include a compressor coupled to a float, the float configured to move (e.g., vertically) based on wave action, and the movement of the float drives compressor. For example, the float is arranged intended to be positioned along the surface of a body of water and designed to generally move with the waves present in the water, and the compressor is configured such that the movement of the structure by waves provides force to intake air and generate compressed air. The compressor can be configured to be driven by a single directional movement of the float or a bi-directional movement of the float. In some embodiments, each of the one or more discharge systems includes a structure (e.g., a piston) moveable in a first direction and a second direction within its cavity, and the movement of the structure is actuated by the compressed air provided to the exhaust system, for example using the compressed air to drive one or more pneumatic actuators coupled to the structure. In some embodiments, the compressor comprises one or more pistons configured to generate compressed air when the float moves in a first direction and a second direction. The compressed air system can also include a compressed air storage tank in communication with the compressor and the plurality of channels and valves. In various embodiments, the compressed air tank can be positioned near and coupled to the compressor, or it can be located deeper underwater closer to the discharge system. In some embodiments, the compressed air system includes a plurality of compressed air storage tanks.

In some embodiments, the compressed air system further includes an air cooler positioned between the compressor and the air storage tank, the air cooler comprising a heat exchanger configured to reduce the temperature of compressed air flowing from the compressor to the air storage tank. In some embodiments, the compressed air system further includes an air dryer positioned between the compressor and the air storage tank, the air dryer configured to remove moisture from the compressed air flowing from the compressor to the air storage tank. The air dryer can be positioned between the air cooler and the air storage tank.

In some embodiments, the compressed air system further comprises an air treatment system configured to condition the compressed air for downstream applications. In some embodiments, the air treatment system is configured to filter the compressed air. In some embodiments, the air treatment system is positioned between the air storage tank and a pneumatic actuator of the exhaust system. In some embodiments, the air treatment system is configured to dry the compressed air. In some embodiments, the compressed air system includes a pressure regulator configured to regulate the pressure of compressed air provided by the compressed air system. In some embodiments, the air treatment system includes a pressure regulator configured to regulate the pressure of compressed air leaving the air treatment system. In some embodiments, the control system is configured to control and/or monitor the pressure regulator to sense and/or control the pressure of the compressed air provided by the compressed air system to the exhaust system. In some embodiments, the control system is configured to control the pressure regulator to a predetermined level. In some embodiments, the compressed air system includes one or more direction control valves and one or more pneumatic actuators each coupled to a direction control valve, wherein each direction control valve is configured to receive compressed air from the compressed air storage tank and provide it to the one or more pneumatic actuators to operate the one or more pneumatic actuator, and the direction control valve is further configured to receive air from the pneumatic actuator and exhaust the air. In some embodiments, each pneumatic actuator comprises a piston.

In some embodiments, the exhaust system comprises one or more discharge systems each having a cavity, the one or more discharge systems comprising a first discharge system including a first cavity, the first discharge system structured to receive water from the chamber into the first cavity and discharge the water. In some embodiments, the system comprises at least two chambers, and the exhaust system is configured to remove water from each of the at least two chambers. In some embodiments, wherein the one or more discharge systems comprise at least two discharge systems structured to receive water from the chamber and discharge the water. In some embodiments, the control system is configured to operate the at least two discharges systems to receive water from the chamber at least partially non-simultaneously providing a substantially continuous flow of water from the chamber to the exhaust system. In some embodiments, the at least two discharge systems comprise three or more discharge systems arranged around the chamber. In some embodiments, the at least two discharge systems comprise six discharge systems arranged around the chamber. In some embodiments each of the one or more discharge systems includes a first valve between the chamber and the cavity of the respective discharge system, and a second valve between the cavity and the ambient environment of the discharge system, wherein the first valve and the second valve are operatively controlled by the control system to allow water to flow into the discharge system cavity and be exhausted out of the discharge system cavity. In some embodiments, each of the one or more discharge systems further comprises a third valve between the chamber and the cavity of the respective discharge system, and a fourth valve between the cavity and the ambient environment of the discharge system, wherein the first, second, third, and fourth valves are operatively controlled by the control system to allow water to flow into the discharge system cavity via the first valve when water is being exhausted from the discharge system cavity via the second valve, and to allow water to flow into the discharge system cavity via the third valve when water is being exhausted from the discharge system cavity via the fourth valve. In some embodiments, the control system comprises a sensor for sensing flow of water through the turbine assembly, and the control system is configured to operate the exhaust system to remove water from the chamber to maintain the flow of water through the turbine assembly at a predetermined level.

Another innovation includes a method of generating hydroelectric energy, the method comprising (i) positioning a hydroelectric energy system underwater, the hydroelectric system including a turbine assembly having a proximal end and a distal end, the turbine assembly comprising a conduit having a fluid channel for communicating fluid extending between the proximal end and the distal end, and one or more hydroelectric turbines positioned within the conduit, the one or more turbines driven by water flowing through the conduit and into and through the turbine assembly, an intake manifold having one or more openings and coupled to the proximal end of the turbine assembly, the intake manifold structured to communicate fluid received through the one or more openings to the turbine assembly, a chamber coupled to the distal end of the turbine assembly, the chamber structured to receive water flowing through the turbine assembly, an exhaust system coupled to the chamber and in fluid communication with the chamber, the exhaust system comprising one or more discharge systems each having a cavity, the one or more discharge systems comprising a first discharge system including a first cavity, the first discharge system structured to receive water from the chamber into the first cavity and discharge the water; and a control system operatively connected to the exhaust system, the system is structured to be placed in an operating position underwater with the proximal end of the turbine assembly positioned higher than the distal end of the turbine assembly, and wherein the control system is configured to operate the exhaust system to remove water from the chamber at a first rate that is faster than, or equal to, a second rate of water flowing into the chamber from the turbine assembly; and (ii) controlling the exhaust system with the control system to remove water from the chamber such that a void of air is maintained in the chamber. In some embodiments, the method includes controlling the exhaust at a first rate that is faster than, or equal to, a second rate of water flowing into the chamber from the turbine assembly causing the one or more turbines to spin and generate energy.

Another innovation includes a method of generating hydroelectric energy with a system positioned underwater, the method comprising: receiving water in an intake manifold having one or more openings and coupled to the proximal end of a conduit, controlling a flow of water from the intake manifold into the proximal end of a turbine assembly, the turbine assembly having one or more turbines positioned to be driven by the water flowing from the intake manifold through the turbine assembly and into a chamber; and controlling an exhaust system, coupled to the chamber and in fluid communication with the chamber, to remove water from the chamber to maintain an air void in the chamber.

Another innovation includes a system for generating hydroelectric energy underwater, comprising: a turbine assembly comprising a conduit having a fluid channel for communicating fluid extending between the proximal end and the distal end, and a hydroelectric turbine positioned within the conduit, the hydroelectric turbines driven by water flowing through the conduit and into and through the turbine assembly; an intake manifold coupled to the turbine assembly, the intake manifold structured to communicate fluid received through the opening to the turbine assembly; a chamber coupled to the turbine assembly, the chamber structured to receive water flowing through the turbine assembly; an exhaust system coupled to the chamber, the exhaust system structured to receive water from the chamber into the cavity and discharge the water; and a control system operatively connected to the exhaust system, the control system configured to operate the exhaust system to remove water from the chamber to maintain an air void in the chamber. Any of the features and components disclosed herein can be included in such systems.

BRIEF DESCRIPTION OF THE DRAWINGS

FIG. 9A illustrates a state of the exhaust system where the exhaust system is receiving water from a chamber, the water flowing into a cavity of the exhaust system and the bladder is uninflated, and FIG. 9B illustrates a state of the exhaust system where the bladder is inflated and water is expelled from the cavity of the exhaust system.

FIG. 10A illustrates a state of the exhaust system where the exhaust system is receiving water from a chamber, the water flowing into a cavity of the exhaust system and the structure is in an unactuated position, and FIG. 10B illustrates a state of the exhaust system where the structure is an actuated state and water is expelled from the cavity of the exhaust system.

DETAILED DESCRIPTION

Figure 1:
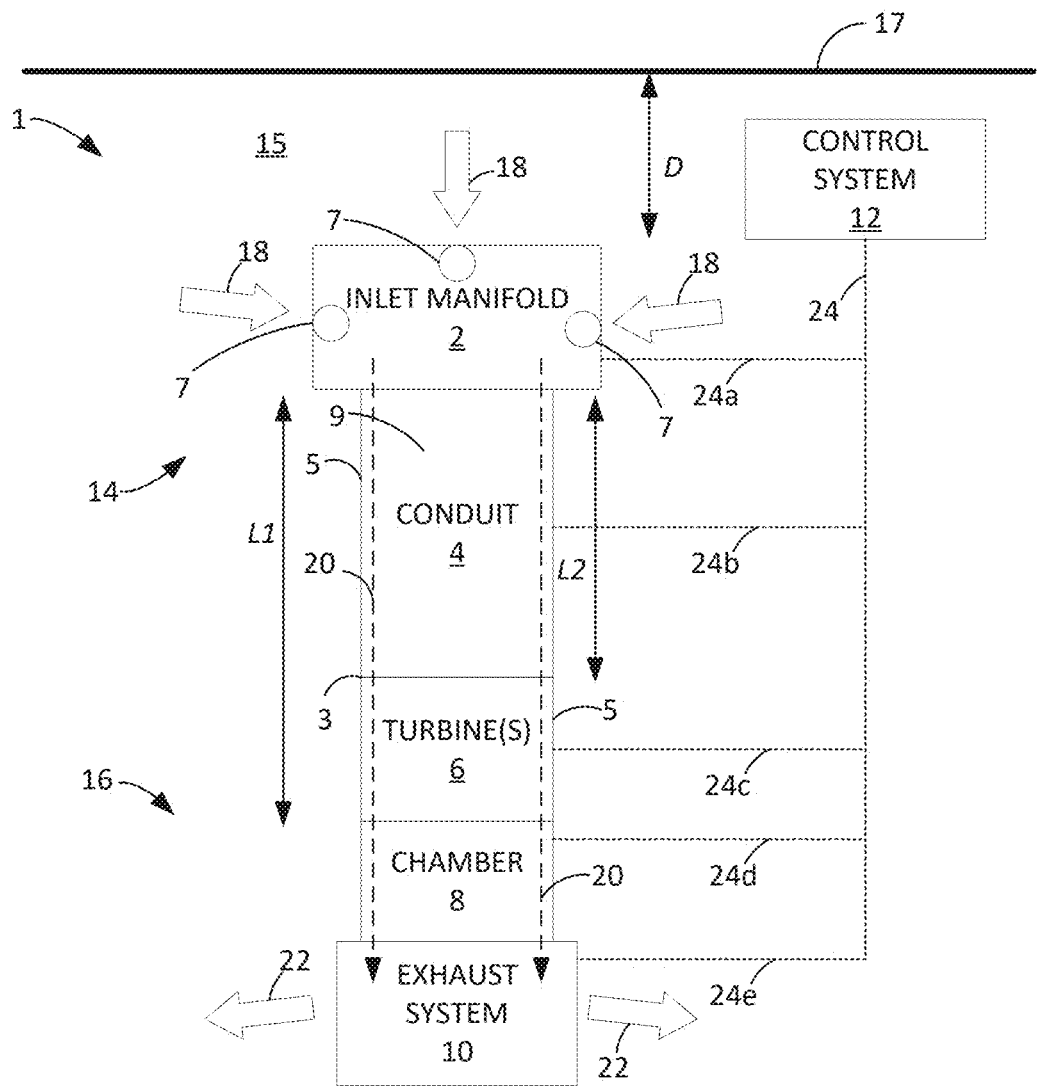
FIG. 1 illustrates block diagram of an example of an underwater kinetic flow system for generating hydroelectric energy.

The following detailed description describes embodiments of underwater kinetic flow systems and methods for generating hydroelectric energy, some of which are illustrated in the figures. These embodiments are not intended to be limiting, and various modifications, variations, combinations, etc., of the features of these embodiments are possible and within the scope of this disclosure.

In embodiments related to the present disclosure, a hydroelectric system is positioned under a body of water and uses ambient water to create a kinetic flow to generate electricity. The hydroelectric system includes a turbine, a column of water inside a structure, and chamber below the vertical column of water. The turbine is positioned such that as the column of water flows into the chamber, the water flows through the turbine and powers the turbine. The chamber encloses a certain volume in which air can be held. During energy generation, an air void (referred to herein as a "void" for ease of reference) is maintained in the chamber allowing a continuous flow of water into the chamber. The structure can be, for example, a turbine assembly which may include a conduit and at least one turbine positioned within the conduit such that the flow of water in the conduit moves the turbine. In some embodiments, the hydroelectric system can include more than one turbine that are powered by water flowing in the conduit. In some embodiments, a conduit can include multiple water channels each providing a flow of water to a turbine. To maintain a void in the chamber that can receive the column of water, an exhaust system can be used to first receive water from the chamber and then expel the water back to the body of water. When positioned for use to generate energy, the structure can be located within a sufficiently deep body of water, such as an ocean location.

Examples of hydroelectric systems disclosed herein may be described or characterized using various terms. For example, the hydroelectric system may be described as having a conduit to provide a fluid communication channel for the kinetic flow, a hydroelectric turbine positioned to be moved by the kinetic flow, a void chamber to receive the kinetic flow after it passed through the turbine, and an exhaust chamber for removing water from the void chamber and expelling the water into the body of water. As described to herein, a "conduit" can be described or characterized as being part of a turbine assembly that includes a conduit and one or more turbines which are positioned to be moved by water moving in the conduit (e.g., the "kinetic flow"). A "void chamber" (that receives the kinetic flow after it passes through the one or more turbines) can be referred to simply as the "chamber." An "exhaust chamber" (or "exhaust tank") can also be referred to as an "exhaust system." An exhaust system can be characterized as including a "discharge system" that has a cavity that, like an "exhaust chamber," receives water from the chamber ("void chamber"). A discharge system includes valves that can be controlled to receive water from the chamber into the cavity of the discharge system and then expel the water from the cavity into the body of water. A discharge system also includes a mechanism to expel the water from the cavity. The mechanism can include, for example, a movable structure that can be moved through the cavity to push water from the cavity through an exhaust valve(s), a bladder that is expanded to push water from the cavity through an exhaust valve(s), or another mechanism configured to expel water from the cavity. An exhaust system can include one or more discharge systems that are configured to receive water from the chamber and then expel the water into the body of water. In embodiments with more than one discharge system, the exhaust system can be configured and controlled to operate more than one discharge system simultaneously, or in a sequence, to continuously remove water from the chamber.

In operation, the chamber may be partially filled with water and partially filled with air. For example, at the start of energy generation, the chamber may be completely (or nearly so) filled with air to form a void in the chamber. The vertical column of water above the void is used to create kinetic potential for a "waterfall" (or "kinetic flow") within the body of water as the column of water flows downward through the turbine and into the chamber. Maintaining the void in the chamber allows the column of water to continuously flow into the chamber. The term "waterfall" as used herein refers to movement or flow of water from a first area (e.g., closer or proximal to the surface of the body of water) to a second area (e.g., that is farther or distal from the surface of the body of water), and the water flow in the turbine assembly moves a turbine for generating energy (e.g., electricity). Air bubbles may rise in water between about 1-2 feet/second, depending on the bubble size. Although air in the chamber could flow upward through the turbine and conduit to the water surface if the flow of water in the kinetic flow stops or slows, during energy generation operations the kinetic flow into the chamber is at a rate faster than air can ascend in water, and this prevents air from escaping from the chamber. For example, the energy system is designed such that during energy generation, the kinetic flow produces a flow of water (downward) at a rate of greater than 2 feet/second. In some embodiments, the energy system is designed such that the flow of water from an inlet of the energy system to the chamber is at least about 3, 4, 5, 6, 7, 6, 7, 8, 9, or 10 feet per second, or greater than 10 feet per second, depending on friction and the height of the kinetic flow.

An exhaust system is in fluid communication with the chamber via one or more valves, and removes the water from the chamber to maintain the void in the chamber. The exhaust system expels the water back into the body of water in which the energy generating system resides, so no water is actually removed, or lost, from the body of water. This allows embodiments of the hydroelectric system to have an unlimited supply of water. While embodiments of the disclosed systems and methods may have some external power supplied to run certain components (e.g., a control system), in many embodiments the systems and methods do not require external inputs such as a power source, and do not rely on environmental elements such as rainfall, snow melt, or heat to generate energy or maintain maximum energy generation. Instead, such embodiments can use power from another source (e.g., a battery, electrical cable, etc.), or use pneumatic power generated from waves and/or wind and/or solar energy, or another energy source. In an example, certain systems and methods can use wave action as a power source to compress air that is used to operate the system. Systems, methods, and devices according to the present disclosure can minimize environmental and ecological impacts and reduce inputs required to operate the system, which can solve the typical concerns associated with existing hydropower methods, such as adverse weather limitations, geographic potential or accessibility, operational times, or the flow of the kinetic flow depleting the reservoir.

The energy generation system can be located in any body of water, for example but not limited to a coastal water body, a location in the ocean, a lake, or another body of water manmade or natural. The energy generation system includes a water intake (or inlet manifold) which may include filters or screens to prevent anything other than water from entering the energy generation system. The energy generation system can include a column, conduit, or other structure configured to confine and direct a column of water to the chamber, and this portion of the system can be referred to as a "kinetic flow section." The kinetic flow section is connected to and configured to receive water from the water intake. The system also includes a turbine positioned to receive water from the kinetic flow section, and a chamber coupled to the kinetic flow section and positioned to receive water from the turbine. In some non-limiting examples, the turbine is located within the kinetic flow section, and the void chamber receives water from the kinetic flow section after it has passed through the turbine. In some implementations, the system includes a void maintenance subsystem.

In implementations where the system is located in an ocean environment, the water intake is submerged, allowing the entire ocean to become the water source. Advantageously, this location can insulate most or all of the system and its subcomponents from common weather and environmental considerations (for example, warm, cold, sunny, dark, windy, rainy, etc.), as it will be in a consistent environment. Underwater energy generation using the systems and methods described herein can be advantageous because the effects of tides, waves, and ocean currents on the system are eliminated or minimized. In some implementations, the water intake may include a screen to reduce or prevent entry of marine life and/or debris from entering the water intake, the kinetic flow section, and/or the turbine. In some examples, the system may use a kinetic flow section with, for example, 50-100 feet of head for the water to generate energy at the turbine. In some implementations, the kinetic flow section may be shorter or longer.

The water column is directed from the surface of the body of water, through the water intake, down the kinetic flow section where it flows into a turbine, and then into a chamber having an air void therein. The kinetic flow section can be included in the structure of a turbine assembly, where the turbine assembly includes, for example, a conduit comprising the kinetic flow section and a turbine, or at least one turbine. The turbine assembly is configured to intake water from an inlet manifold and exhaust water into the chamber. In some examples, one or more turbines are located within the turbine assembly, for example, in the kinetic flow section. In preferred embodiments, the chamber is located in the system at the bottom turbine assembly (e.g., below the kinetic flow section and below the turbine). At the start of an energy generation operation, the chamber is filled fully or at least partially with air creating a void in the chamber where there is no water. Water entering the chamber is expelled from the chamber at the same rate or substantially the same rate as water entering the chamber in order to maintain the (air) void, thereby creating space for additional water flowing down the kinetic flow section. The water can be expelled from the chamber using an exhaust system coupled to the chamber as described herein. As indicated above, the kinetic flow downward through the turbine is at a flow rate that is faster than air can rise in water, which prevents air from escaping up through the turbine and water column. The energy to maintain the void in the chamber by expelling water from the chamber at a rate equal to the rate of water flowing into the chamber is maintained by a separate source. Because the kinetic flow is created underwater, the expelled water is evacuated from the submerged chamber, rather than gravity fed out at the end of the process.

In the energy system, equilibrium can be maintained between the kinetic flow entering the chamber and the evacuation of the water from the chamber, thus providing continuous operation. In some implementations, a secondary process of using a parasitic loss from the turbine generation itself could provide the energy required to maintain the void.

In some implementations, compressed air can be used to maintain the void in the chamber by expelling the water using a mechanism powered by the compressed air, directly (using the compressed air to fill the chamber to displace water in the chamber, or indirectly (using the compressed air to actuate a mechanism/system to remove the water). In an example, an exhaust system coupled to the chamber may use a large piston or bladder to maintain the void in the chamber by first receiving water from the chamber into a cavity of the exhaust system, and then expelling the water from the exhaust system. In some implementations, an array of multiple chambers may be used, each chamber having a void. The array of multiple chambers may be interconnected or they may receive water through independent connections to a kinetic flow that passes through a turbine.

In some implementations, the chamber is connected to a cavity in an exhaust system further connected to a pneumatic system and a water exhaust manifold. The exhaust system cavity can be filled with compressed air from the pneumatic system, which pushes the used water volume from the exhaust system cavity to the ambient body of water. In some implementations, the exhaust system cavity can close to the outside environment and open to the chamber, which will fill the exhaust system cavity with water from the chamber. The exhaust system cavity can then be closed to the chamber and opened to the ambient body of water to equalize any pressure differential, and the water can then be pushed out by filling the exhaust system cavity with air to move the water from the exhaust system cavity. The exhaust system cavity then be closed to the outside, and opened to the chamber to start the process again. In some implementations, such as the system illustrated in FIG. 1, the chamber is connected to multiple portions of an exhaust system, each of the multiple portions having a cavity. In such embodiments, each portion of the exhaust system can be referred to as a "discharge system." In some embodiments, an exhaust system can include a first discharge system having a first cavity which may be placed in fluid communication with the chamber to receive water from the chamber while cavities of one or more additional discharge systems are emptied, thus allowing continuous operation. The number and size of an exhaust system discharge system may be optimized based on desired flow parameters, for example, volume, velocity, etc.

In some non-limiting examples, one or more pistons are configured to push water from a cavity of an exhaust system to the ambient body of water, rather than a pneumatic system using compressed air. As with the compressed air option, cavities (or "exhaust chambers") of the exhaust system will close to the outside environment and open to the chamber, which will fill the exhaust chambers. Next, the exhaust chambers will close to the chamber having the void (or the "void chamber") and open to the ambient body of water, which will equalize any pressure differential, allowing water in the exhaust chambers to be pushed out by a piston moving the volume of water. Next, the exhaust chamber will close to the ambient body of water, and open to the void chamber, starting the process again.

The power for the pressurized air or the piston used to empty the void chamber(s) can be extracted from the mechanical motion of the surface waves. For example, in some implementations, the void may be maintained in the void chamber(s) using surface waves to create a mechanical motion to force air into an underwater air compression chamber, thus creating a pneumatic system.

In embodiments of the present disclosure, nearly all of the energy generation can be used for the grid, as the kinetic flow system and pneumatics can be completely separate systems. Because the wave motion can be completely separate from the energy generation portion, the void maintenance system can be powered separately, thereby allowing all energy generated by the turbine to contribute to the final output of the system. In some implementations, a mechanical void maintenance subsystem may expel water from the void chamber via a large piston or bladder forcing the water from the filled chamber. In some implementations, a single void chamber may be maintained with multiple exhaust sections, each connected to the main void chamber.

Some implementations may include a series of two or more large (void) chambers below the turbine assembly. Each void chamber can be cyclically filled by the outflow from the turbine, cycling valves to maintain continuous flow, and then emptied by air pressure generated by wave action. As the currently active chamber approaches full, outflow from the turbine section can be diverted to the next available empty void chamber by coordinated automatic closing of the filled void chamber's input and air vent valves, opening of its exhaust and pressurized air valves, and the opening of the subsequent void chamber's input and air vent valves. Accordingly, in some example implementations, individual void chambers are isolated from flow from the kinetic flow section, for example by closing a valve between the kinetic flow section and the individual void chamber.

When a first void chamber is so isolated, a second individual void chamber can receive water from the kinetic flow section, for example by opening a valve between the kinetic flow section and the second void chamber. After the first void chamber is filled with water and isolated from the kinetic flow section, the first void chamber can be emptied as discussed above as the second void chamber fills. As each individual void chamber is isolated from the kinetic flow section, it can be connected to an associated exhaust chamber, where compressed air or a mechanical system can be used to remove the water.

LIST OF CERTAIN COMPONENTS

The following is a list of certain components that are described and enumerated in this disclosure in reference to the above-listed figures. However, any aspect of the devices illustrated in the figures, whether or not named out separately herein, can form a portion of various embodiments of the invention and may provide basis for claim limitation relating to such aspects, with or without additional description. The enumerated components include:

1 system for generating energy
2 inlet manifold
3 turbine assembly
4 conduit
5 conduit wall
6 one or more turbines
7 openings
8 chamber (or void chamber)
9 fluid channel
10 exhaust system
11 discharge system
12 control system
14 proximal end
15 body of water
16 distal end
17 surface of body of water
18 water flow into inlet manifold
20 fluid flowpath from inlet manifold to exhaust system
22 water flow from exhaust system
24 control (or signal) lines
26 screen/filter assembly
28 compressed air manifold
30 air compression system
32 air channel to compressed air manifold
34 inlet to conduit valve(s)
36 conduit to turbine assembly valve(s)
38 turbine assembly to chamber valve(s)
40 chamber to exhaust system valve(s)
42 air manifold to exhaust system valve(s)
44 water exhaust valve(s)
46 air exhaust valve(s)
48 air compression system to air manifold valve(s)
50 air exhaust valve (e.g., to exhaust air manifold)
52 exhaust air manifold
54 exhaust system cavity
56 chamber to exhaust system cavity valve
58 exhaust system cavity outlet valve
60 piston
62 direction of piston movement
70 air filter
72 air channel
74 compressor
76 floatation device (or "float")
78 air cooler
80 air dryer
82 compressed air storage tank (or air reservoir)
84 air treatment system
86 direction control valve
88 vent to atmosphere
90 pneumatic actuator
92 piston
94 load
96 shaft
98 air supply to pneumatic actuator
100 air supply from pneumatic actuator
102 compressed air channels from compressor to reservoir to direction control valve
104 waves, sea surface
106 air recapture line
108 sensors
110 process for generating hydroelectric energy
130 bladder

ILLUSTRATIVE EMBODIMENTS

FIG. 1 illustrates a block diagram of an example of an underwater kinetic flow energy system 1 (sometimes herein referred to as a "energy system" for ease of reference) for generating hydroelectric energy, according to some embodiments. The energy system 1 can be described as having a proximal end 14 and a distal end 16. When the energy system 1 is positioned (underwater) in a body of water 15 in an operational alignment, the proximal end 14 is generally positioned closer to the surface 17 of the body of water 15 than the distal end 16. In some embodiments, the proximal end 14 of the energy system 1 is vertically aligned over the distal and 16 of the system, as illustrated in FIG. 1. In other embodiments, the proximal end 14 of the system 10 is substantially vertically aligned over the distal and 16 of the system. Components of the energy system 1 can also be described as having a proximal end 14 and a distal end 16 corresponding to these relative positions.

As illustrated in FIG. 1, in this example the energy system 1 includes several components, including an inlet manifold 2, a turbine assembly 3, a chamber 8, an exhaust system 1, and a control system 12. The turbine assembly 3 can be coupled to the inlet manifold 2 on the proximal end 14 of the turbine assembly 3, and can be coupled to the chamber 8 on the distal end 16 of the turbine assembly 3. The distal end 16 of the chamber 8 can be coupled to the exhaust system 10. The control system 12 can be coupled to one or more of the inlet manifold 2, the turbine assembly 3, the chamber 8, and the exhaust system 10 to receive information relating to the operation of the energy system 1, and/or to control the operation of the energy system 1. For example, to control operation of the turbine 6, to open and close valves coupled to the inlet manifold 2, the turbine assembly 3, the chamber 8, and the exhaust system 10 to control a flow of water from the body of water 15 into the inlet manifold 2, through the turbine assembly 3, into the chamber 8, through the exhaust system 10, and back into the body of water 15. The control system can be configured to control the exhaust system 10 to remove water from the chamber 8 at a rate sufficient to maintain air in the chamber to maintain a constant flow of water through the energy system. 1 Although not illustrated in FIG. 1, the energy system 1 can include a plurality of valves that can be operated by the control system to control the flow of water through the system. Some examples of arrangements of such valves are illustrated in the embodiments illustrated in FIGS. 2-4.

Still referring to FIG. 1, the intake manifold 2 can have one or more openings 7 and is coupled to the proximal end 14 of the turbine assembly 3. The intake manifold 2 is structured to receive water through one or more openings 7 and communicate water received to the turbine assembly 3. In some embodiments, the intake manifold 2 comprises the proximal end 14 of the turbine assembly 3 (e.g., the proximal end of the conduit 4). In some embodiments, the intake manifold 2 can receive water from an opening on the top and/or the side as illustrated by the water flow arrows 18. In some embodiments, the intake manifold can receive water from an opening on a bottom portion of the inlet manifold 2. In some embodiments, the inlet manifold 2 includes one or more screens, filters etc. prevent debris (e.g., anything other water) from flowing into the turbine assembly 3. In various embodiments, the inlet manifold can be positioned at a depth D of between about 1 and 50 feet below the surface 17 of the water 15. For example, the depth D can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 feet, plus or minus 0.5 feet. In some embodiments, the inlet manifold can be positioned at a depth D greater than 50 feet below the surface 17 of the water 15.

The turbine assembly 3 includes a conduit 4 and one or more turbines 6. The one or more turbines 6 are positioned within the conduit 4 and are driven by water flowing through the conduit 6 and into and through the turbine assembly 3. In some embodiments, there can be two turbines. In some embodiments, there can be more than two turbines. For ease of reference, the phrase "one or more turbines 6" may be generally referred to herein in the singular, for example, "a turbine 6" or "the turbine 6". The turbine assembly 3 includes a fluid channel 9 for communicating fluid through the conduit 4 and so that it passes through the turbine 6. The conduit 4 includes a conduit wall 5 which can define the fluid channel 9. The fluid channel 9 extends between the turbine assembly 3 proximal end 14 and its distal end 16. The conduit 4 can have a cylindrical, rectangular, or any other cross-sectional shape that allows fluid to flow within it, and different portions of the conduit may have different shapes (e.g., cylindrical, rectangular, etc.). In some embodiments, the conduit 4 can have two or more fluid channels. In various embodiments, the length L1 of the turbine assembly 3 (including the conduit 4) can be between about 10 feet and 100 feet (or more) such that the "waterfall" may have up to about 100 feet of "head" (i.e., the depth of the column of water above the turbine) for the water to generate energy at the turbine. For example, column of water above the turbine can be at or about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 feet, plus or minus 0.5 feet. In some embodiments, the length of the conduit L2 can be between 8 feet and 100 feet. For example, at or about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 feet, plus or minus 0.5 feet. In some embodiments, the turbine assembly is greater than 100 feet in length. For maintenance and repair purposes, in some embodiments it can be advantageous to have the energy system 1 positioned at a depth where it can be accessed using scuba gear, e.g., at a depth not greater than about 110 feet.

The chamber 8 coupled to the distal end 16 of the turbine assembly 3, and the chamber 8 structured to receive and (temporarily) hold (e.g., in a void) water flowing through the turbine assembly 3.

Figure 2:
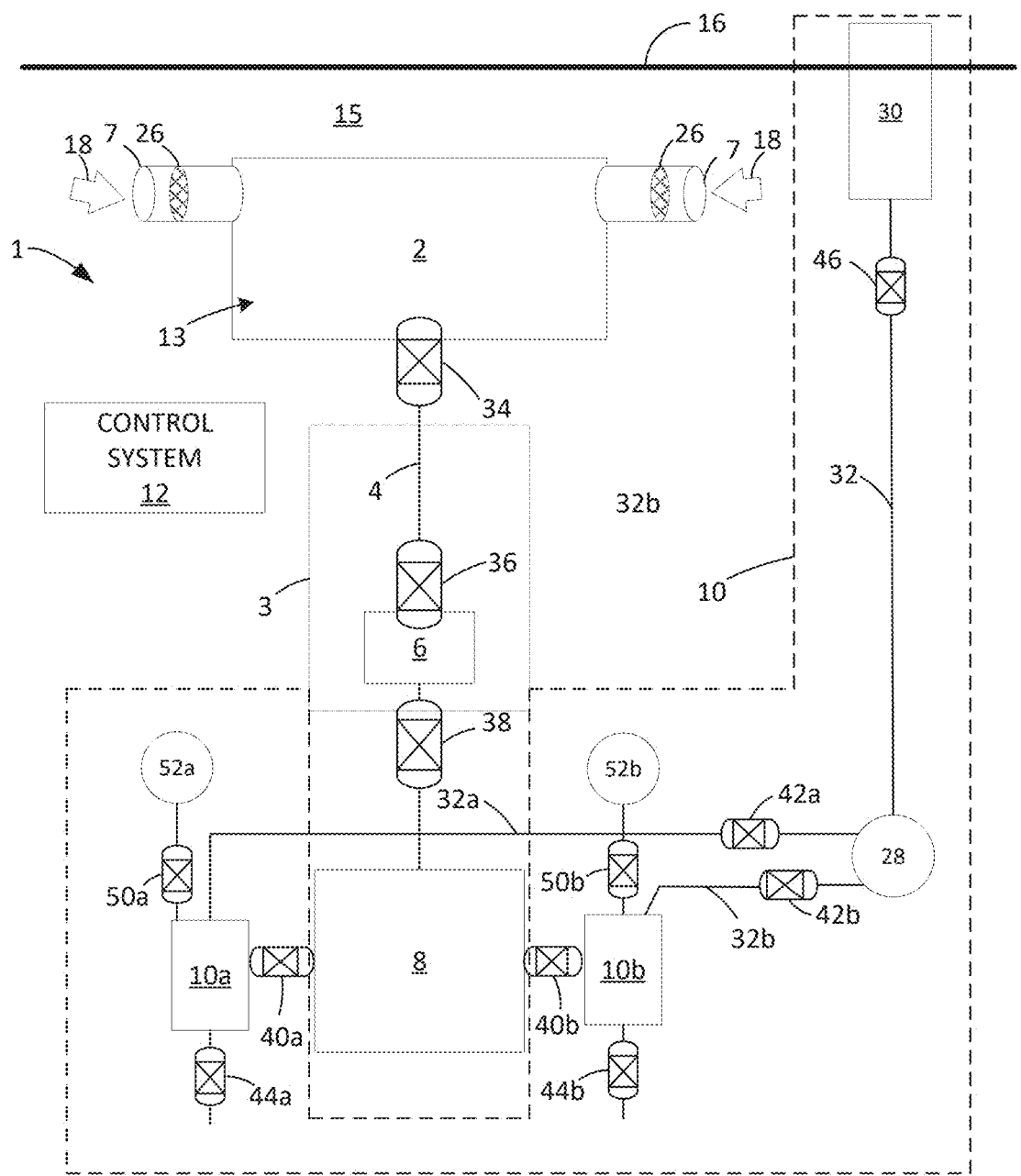
FIG. 2 illustrates an embodiment of an underwater kinetic flow system for generating hydroelectric energy.
Figure 3:
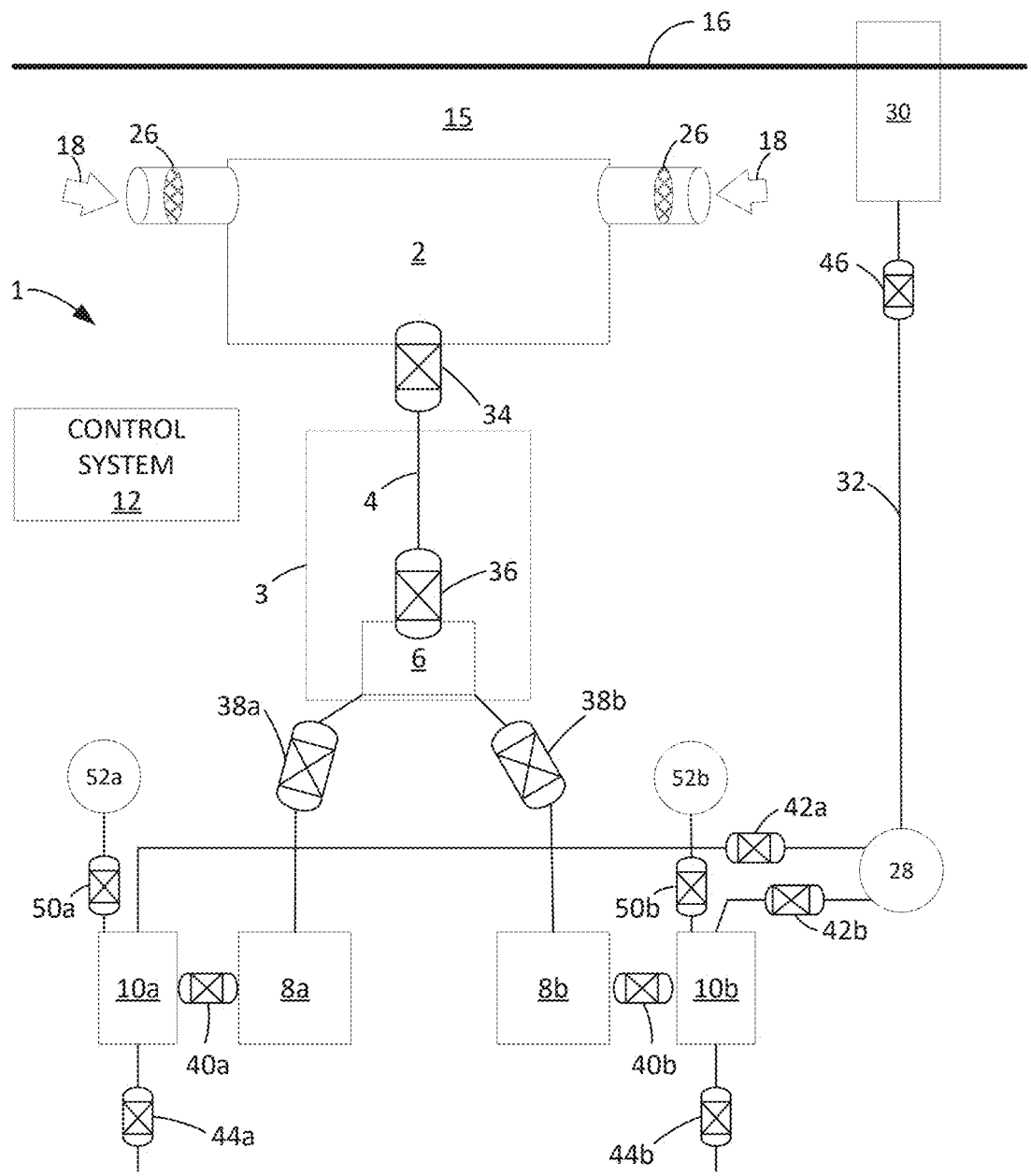
FIG. 3 illustrates another embodiment of an underwater kinetic flow system for generating hydroelectric energy.
Figure 4:
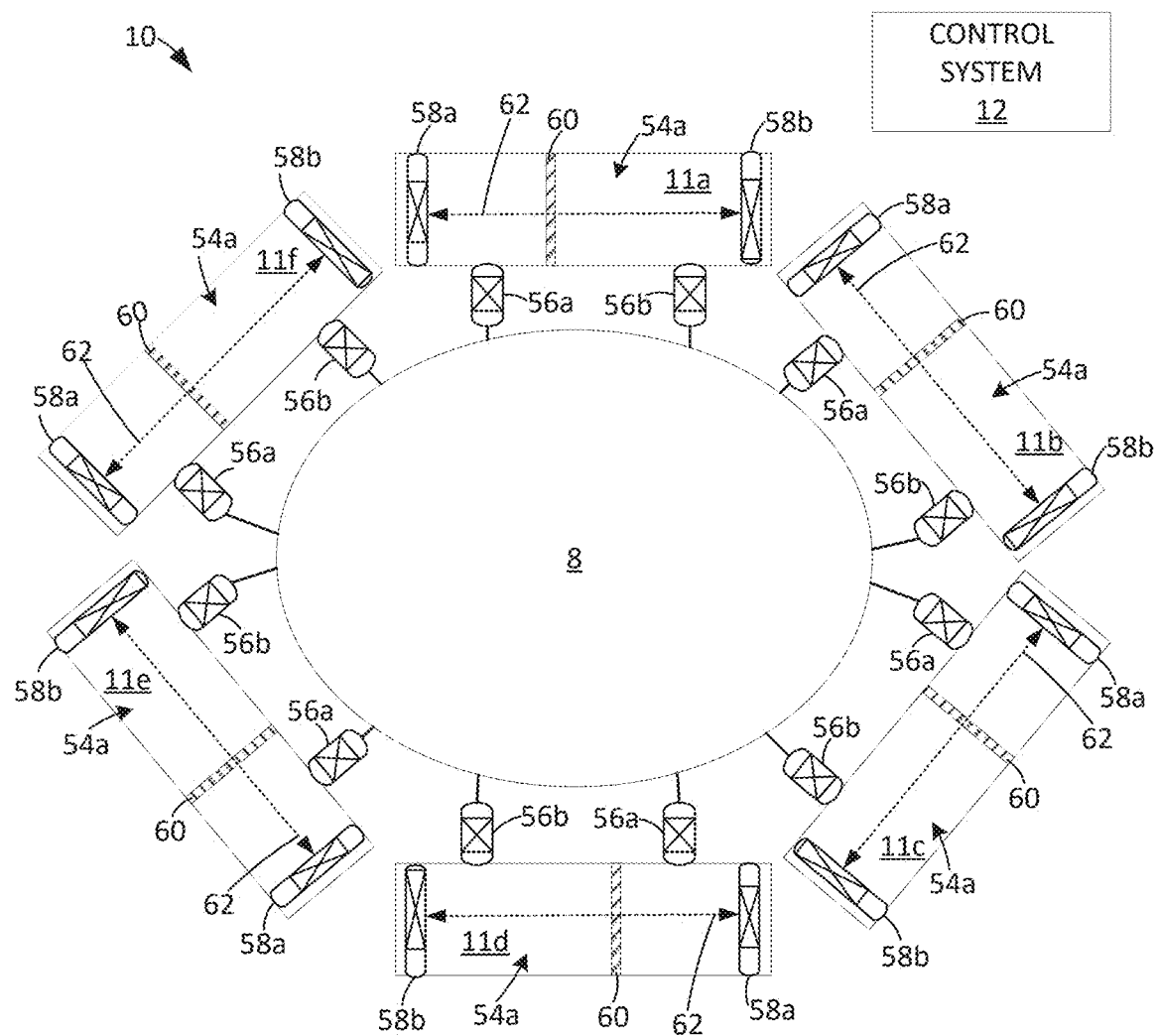
FIG. 4 illustrates an embodiment of an exhaust system having a plurality of discharge systems (six, in this example) that are arranged around a chamber of a system for generating hydroelectric energy.

The exhaust system 10 is coupled to the chamber 8, and is configured to remove water from the chamber at a first rate that is faster than, or equal to, a second rate of water flowing into the chamber 8. Several examples of exhaust systems 10 are illustrated in FIGS. 2-4. As illustrated in FIG. 4 and describe below, the exhaust system 10 can include one or more discharge systems 11. Each discharge system 11 includes a cavity 54 that is configured to be in fluid communication with the chamber 8 such that water in the chamber 8 can flow into the cavity 54 thus removing it from the chamber 8, which allows water to continue to flow through the turbine assembly 3 and into the chamber 8.

The control system 12 can be operatively connected to the energy system 1 via control lines 24, and can be configured to operate the system to produce a flow of water through the turbine assembly 3 to generate electricity. In some embodiments, the control system 12 is operatively connected to a plurality of valves to control the water flow from the intake manifold 2 to the turbine assembly 3, from the turbine assembly 3 to the chamber 8, from the chamber 8 to the exhaust system 10, and from the exhaust system 10 to the body of water 15 the system 1 is operating in. Some nonlimiting examples of such valves are illustrated in FIGS. 2-4 and described further below. In some embodiments, the control system can control actuators that open and shut these valves based on predetermined and/or sensed conditions. In some embodiments, the control system receives information from the inlet manifold 2, the turbine assembly 3, the chamber 8, and/or the exhaust system 10. For example, from one or more sensors that are in the energy system 1. In an example, the control system 12 can receive information from a flow sensor in the energy system 1 that indicates the speed of the water flow through the system, from a sensor that indicates the speed of the turbine, and/or from a sensor that indicates the amount of energy generated by the turbine, and the control system 12 can operate the exhaust system to remove water from the chamber faster or slower based on this received information.

FIG. 2 is a schematic illustrating an example of an energy system 1 for generating hydroelectric energy. The energy system illustrated in FIG. 2 is shown as being positioned in a body of water 15, and generally includes the same (or similar) components as illustrated in the energy system of FIG. 1, and includes further details. In the embodiment shown in FIG. 2, the energy system 1 includes an inlet manifold 2 that has a plurality of openings 7 configured to allow water to flow into an interior space 7 in the inlet manifold 2. The inlet manifold 2 includes screens (or filters) 28 that prevents debris (e.g., anything other than water) from entering the interior space 13. The turbine assembly 3 is configured to be in fluid communication with the inlet manifold 2 via one or more valves 34. The turbine assembly 3 includes conduit 4 and one or more turbines 6. In some embodiments, the conduit is configured to be in fluid communication with the turbine 6 via one or more valves 36. A chamber 8 is configured to be in fluid communication with the turbine assembly 3 via one or more valves 38.

The energy system 1 further includes an exhaust system 10 that is in fluid communication with the chamber 8 via a plurality of valves 40. In this embodiment, the exhaust system 10 includes a first portion 10a and a second portion 10b that are positioned near the chamber 8, and are each configured to remove water from the chamber 8. The exhaust system 10 also includes an air compression system 30 (discussed further below), and a plurality of lines and valves that provide compressed air to the exhaust system. The exhaust system 10 can be configured to use the compressed air directly to remove water from the chamber 8, or indirectly use the compressed air to remove water from the chamber 8 (for example, to actuate one or more pneumatic pistons to move structures to exhaust the water from the chamber 8, or to actuate valves, etc.).

The first and second portions 10, 10b may be referred to as "discharge systems" (e.g., first discharge system 10a and second discharge system 10b). In this example, one or more valves 40a controls water flowing from the chamber 8 to a cavity in the first discharge system 10a, and one or more valves 40b controls water flowing to a cavity in the second discharge system 10b. In this example, the exhaust system 10 can includes one or more water exhaust valves 44 and air exhaust valves 50. For example, the first discharge system 10a can include one or more water exhaust valves 44a and one or more air exhaust valves 50a. The second discharge system 10b can include one or more water exhaust valves 44b and one or more air exhaust valves 50b. In some embodiments, air exhaust valves 52a, 52b can provide air that is in the first and second discharge systems to exhaust air manifolds 52a, 52b, respectively. In some embodiments, air in the exhaust air manifolds 52a, 52b is recycled back into the compressed air system. For example, back into compressor 30.

The energy system 1 further includes a control system 12 that is operatively connected to the energy system 1. In an embodiment, the control system 12 is operatively connected to all of the valves in the energy system 1 and is configured to control the operation of the valves (e.g., valves 34, 36, 38, 40, 42, 44, 46, 50) to control the flow of water through the energy system at a rate sufficient for the turbine 6 to generate energy.

Figure 5:
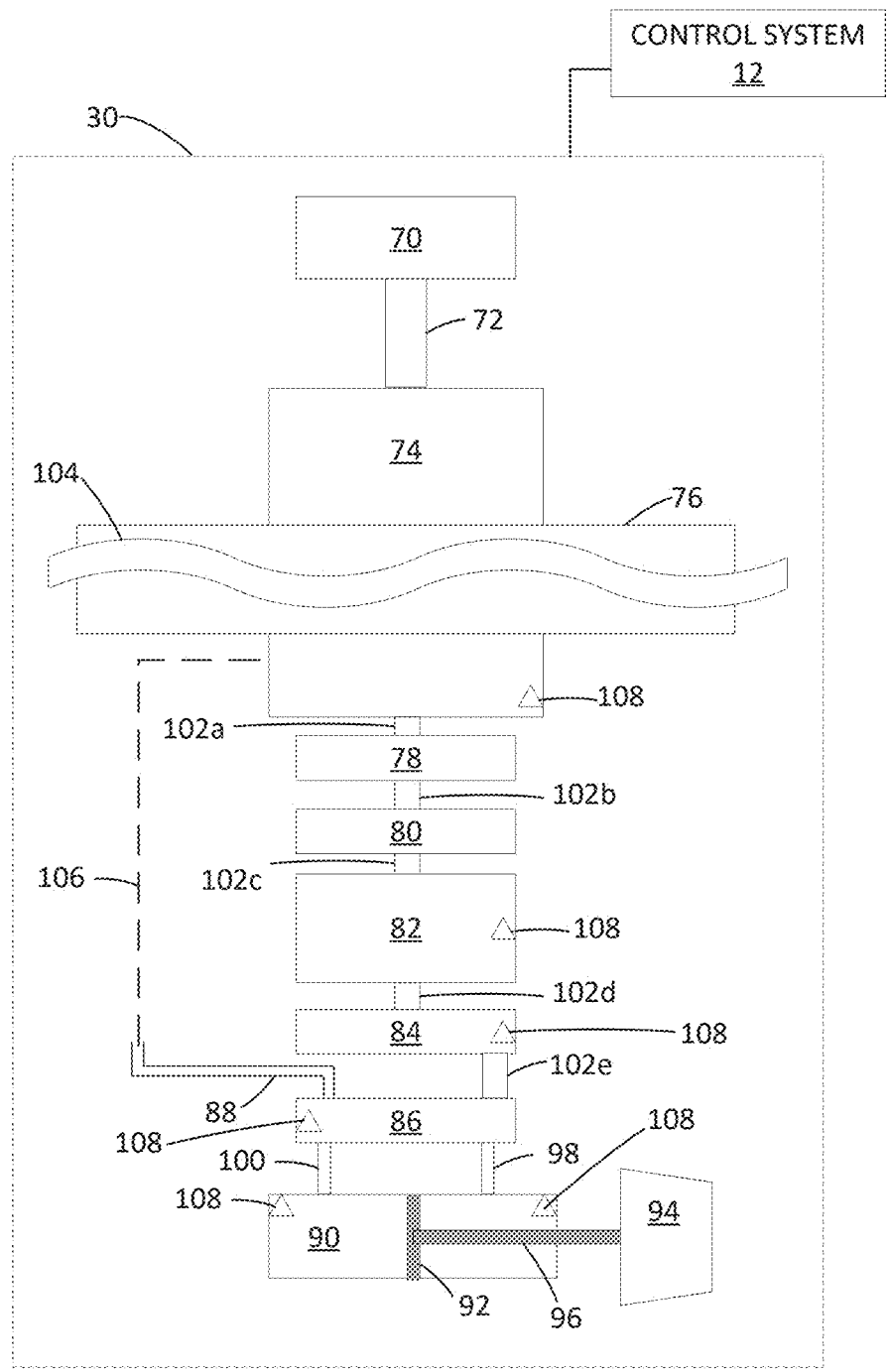
FIG. 5 illustrates an embodiment of an air compression system of an exhaust system.

Still referring to the example of FIG. 2, the exhaust system 10 is configured to generate compressed air, and use the compressed air to remove water from the chamber 8. In this example, the exhaust system 10 includes a compressor 30 that intakes and compresses air using wave motion to power the air compressor 30. In some embodiments, the air compressor 30 is configured to compress air using a single action compression motion actuated by a wave, while in other embodiments the air compressor can use a double action compression motion actuated by the rise and fall of waves. An example of a double-action air compression system that uses wave motion to compress air is disclosed in U.S. Pat. No. 7,781,903, which is incorporated by reference herein. The compressed air can be provided to an air manifold 28 via an air channel 32 and one of more valves 46. The air manifold 28 may also include a compressed air reservoir (or storage tank). In some embodiment, a compressed air reservoir is positioned on or near the compressor 30. Compressed air can be provided from the air manifold 28 to the exhaust system 10 via a series of lines and valves. In this example, compressed air is provided to the first discharge system 10a via valve 42a and line valve 42a, and compressed air is provided to the second discharge system 10b via valve 42b and line 32b. A more detailed example of an air compression system is illustrated in FIG. 5.

In an example of operating the energy system illustrated in FIG. 2, the energy system is positioned underwater, and initially chamber 8 is fully or partially filled with air (ideally fully filled with air), and a cavities in the first discharge system 10a the second discharge system 10b are also initially fully or partially filled with air. Water enters the inlet manifold 2 and flows through valve 34, conduit 4, and the turbine 6 to create the column of water from the inlet manifold 2 to the turbine 6. Valve 38 which connects the turbine assembly 3 to the chamber 8 is initially closed. The compressor 30 compresses air until a sufficient amount of air needed to operate the exhaust system 10 is compressed and stored. When the control system 12 senses that a predetermined amount of compressed air is available to operate the energy system 1, the control system 12 opens valve 38 allowing the column of water above the turbine 6 to begin to flow through the turbine 6 and into the chamber 8. As the chamber 8 begins to fill with water, the exhaust system 10 begins to remove water from the chamber 8 at a rate that that is sufficient to maintain an air void in the chamber 8, which allows the column of water to continue to flow past the turbine 6 and generate energy. In the example of FIG. 2, valve 40a can be opened to allow water to flow into the first discharge system 10a. Then valve 40a is closed, and valve 44a is opened to exhaust the water from the first discharge system 10a. When valve 40a is closed, valve 40b can be opened to allow water to flow into the second discharge system 10b. Then valve 40b is closed, and valve 44b is opened to exhaust the water from the second discharge system 10b. After the water has been exhausted from the first discharge system10a and valve 40b is closed, valve 40a can be opened to again allow water to flow into the first discharge system 10a, and this cycle is repeated.

Various embodiments exhaust system 10 can remove water from the exhaust system in different ways. In an example, the exhaust system can include the cavity and a movable structure (e.g., a piston) that moves through the cavity to force water out of the cavity through a valve at one end of the cavity. The exhaust system may be configured such that the movable structure moves in a first direction through the cavity to exhaust water from a first valve positioned at a first end of the cavity, and in the second direction through cavity to exhaust water from the second valve positioned at a second end of the cavity. One example of this type of configuration of an exhaust system is illustrated in FIG. 4, where the exhaust system includes six discharge systems positioned around a chamber 8. In these types of configurations, the movable structure may be moved by a set of one or more pneumatic actuators that moves the structure in a first direction and the second direction using compressed air. In another embodiment, the compressed air itself is used to push water out of the exhaust system. For example, compressed air can be provided to a cavity in a discharge system such that the compressed air expands and forces water from the cavity. Such systems, it can be advantageous to recapture and reuse at least some of the expanded air, using for example, the air exhaust valve 50 and air manifold 52.

FIG. 3 illustrates another embodiment of an underwater kinetic flow energy system 1 for generating hydroelectric energy. This embodiment includes many of the same or similar components as illustrated in FIG. 2. For example, this embodiment can include an inlet manifold 2, a turbine assembly 3, and an exhaust system 10 (including an air compression system) that is similar to the embodiment illustrated in FIG. 2. However, the embodiment illustrated in FIG. 3 includes a plurality of chambers, that is, a first chamber 8a and a second chamber 8b each of which is connected to the turbine assembly 3 via a different fluid flowpath. Water from the turbine assembly 3 can flow through a first flowpath, that includes valve 38, into the first chamber 8a, and water from the turbine assembly 3 can also flow through a second flowpath, that includes valve 38b, into the second chamber 8b. Also in this embodiment, the exhaust system includes a first discharge system 10a which is configured to remove water from chamber 8a and a second discharge system 10b which is configured to remove water from chamber 8b.

In an example of operation, the control system 12 can direct water flowing through the turbine assembly 3 to the first chamber 8a for a first portion of time (e.g., until water in the first chamber 8a reaches a certain level) by opening valve 38a and closing valve 38b. Then the control system 12 can close valve 38a and open valve 38b to direct water flowing through the turbine assembly 3 to the second chamber 8b. While water is flowing into the second chamber 8b, a first portion of the exhaust system (first discharge system) 10a is actuated to remove the water from the first chamber 8a. Then the control system 12 can close valve 38b and open valve 38a to redirect the flow of water from the turbine assembly 3 to the first chamber 8a, and actuate a second portion of the exhaust system (second discharge system) 10b to remove water from the second chamber 8b while the first chamber 8a is refilling. Although the embodiment illustrated in FIG. 3 illustrates having two chambers 8a, 8b, other embodiments that include more than two chambers are also contemplated.

FIG. 4 illustrates certain components of an embodiment of an exhaust system 10 that included a plurality of discharge systems 11 that are arranged around a chamber 8 of a system for generating hydroelectric energy. This configuration of the exhaust system could be used that has a single chamber 8 (e.g., the energy system illustrated in FIG. 2) or has multiple chambers 8 (e.g., the energy system illustrated in FIG. 3). The exhaust system in this embodiment includes six discharge systems 11a-e. However, in other embodiments, an exhaust system 10 may include more than six discharge systems, or lesson six discharge systems. It can be advantageous to have an exhaust system with multiple discharge systems, rather than a single discharge system, because it can allow the control system 12 to have finer control in removing water from the chamber 8. Also, having multiple discharge systems allows redundancy in case of failure or malfunction of a component associated with the discharge system. In addition, having multiple discharge systems can allow one or more of the discharge systems to be shut down for maintenance of the other discharge systems continue to operate, thus facilitating a more continuous operation of the energy system even when maintenance is required.

As shown in FIG. 4, six discharge systems 11a-f are arranged around the chamber 8. The discharge systems 11a-f are configured similarly. Each discharge system 11 includes a cavity 54 and a piston 60 positioned inside the cavity 54, the piston 60 configured to move in a first direction through the cavity 54, and configured to move in a second direction, opposite the first direction, through the cavity. In this example, the direction of piston movement 60 is bidirectional along the length of the cavity 54. Each discharge system 11 can be placed in fluid communication with the chamber eight via a first valve 56a and a second valve 56b. The first valve 56a is positioned on one side system 60, and the second valve 56b is positioned on the opposite side piston 60. When the first valve 56a is open, fluid can flow from the chamber 8 into the cavity 54 on one side of the piston, and when the second valve 56b is open, fluid can flow from the chamber 8 into the cavity 54 on the other side (the opposite side) of the piston 60. Each discharge system also includes an exhaust system cavity outlet valve 58a positioned on one side of the piston, and an exhaust system cavity outlet valve 58b positioned on the other side (the opposite side of the piston 60). The control system 12 can actuate the first and second outlet valves 58a, 58b to allow water to be exhausted from the cavity 54 due to the movement of the piston 60 through the cavity 54.

In operation, the control system 12 can control each discharge system 11 to receive water from the chamber 8 in discharge the water to the ambient environment. The control system can control each of the plurality of discharge systems 54 to receive water from the chamber 8 simultaneously, or separately. For example, the control system can control each plurality of discharge systems 54 to receive water one at a time, two at a time, three at a time, four at a time, five at a time, or in any sequence and order. In an example of operation, the cavity of a discharge system is initially filled with air (or nearly filled with air) and the movable structure 60 is positioned at one end of the cavity 54, and both of the cavity outlet valves 58 are closed. To operate a discharge system 11, the control system 12 can first open valve 56a such that the largest portion of the cavity 54 receives a certain amount of water from the chamber 6, and then the chamber to exhaust system cavity valve 56a is closed. Next the cavity outlet valve 58a is opened, and the movable structure 60 is moved towards the open cavity outlet valve 58a pushing water out through this valve. When water has been removed from the cavity 54, the control system closes the cavity outlet valve 58a and opens the chamber to exhaust system cavity valve 56b, allowing water to flow from the chamber 8 into the cavity 54. The control system 12 then closes the chamber to exhaust system cavity valve 56b, opens the cavity outlet valve 58b, and moves the movable structure 60 towards the open cavity outlet valve 58b discharging water from the cavity 54 via valve 58b. The control system 12 then closes cavity outlet valve 50b, and this cycle can be repeated.

FIG. 5 illustrates an example of certain components of an air compression system 30 of an exhaust system 10, according to some embodiments of an energy system. Other embodiments may have fewer or additional components. In this example, the air compression system receives uncompressed ambient air through an air filter 70 which is coupled to an air channel 72 which extends above a compressor 74 and above the waves (or sea surface) 104. The air filter 72 removes particulates, water vapor, and oil aerosols from the incoming air to prevent contamination and ensure optimal system performance. The compressor converts mechanical energy into pneumatic energy by compressing atmospheric air to a specified pressure level, serving as the primary power source for the air compression system 30. The air compression system 30 also includes a floatation device 76 that is configured to be buoyant and be moved by waves 104. The floatation device 76 is a flotation-based mechanical driver that is coupled to the compressor 74 and moves vertically with water displacement, generating mechanical energy to drive the compressor. This reciprocating motion harnesses buoyancy to produce compressed air. The air compression system 30 includes one or more compressed are channels 102 that communicate compressed air from the compressor 74 to other components of the compressed air system.

Still referring to FIG. 5, the compressed air system 30 includes an air cooler 78 configured to receive compressed air from the compressor 74. The air cooler 78 is configured as a heat exchanger that reduces the temperature of the compressed air, enhancing efficiency and preventing thermal degradation of downstream components. The compressed air system 30 also includes an air dryer 80, which utilizes adsorption or refrigeration principles to remove moisture from compressed air, mitigating the risk of condensation, corrosion, and performance degradation in the exhaust system 10. The compressed air system 30 also includes an air storage reservoir 82. The air storage reservoir 82 is a vessel that provides a buffer supply of compressed air, stabilizing pressure fluctuations of the compressed air. In some embodiments, the compressed air system 30 also includes a plurality of air storage reservoirs which can be positioned near the compressor, or positioned closer to the chamber 8.

The compressed air system 30 can also include an air treatment system 84 configured as a secondary conditioning process (e.g., for filtration, drying, and/or pressure regulation) that ensure clean, dry, and stable air supply for downstream applications and components. In this example, a direction control valve 86 is configured to receive compressed air and provide it to a pneumatic actuator 90 via an air supply channel 98 to the pneumatic actuator. The pneumatic actuator 90 is a mechanical device that converts compressed air energy into linear or rotary motion, providing actuation for system loads (e.g., the functional output of the pneumatic system). The direction control valve 86 is also configured to receive air from the pneumatic actuator 90 via an air supply channel 100, and can vent the air through vent 88. In some embodiments, vented air is recaptured by the air compression system 30 and reused. For example, in some embodiments instead of releasing air through the vent 88 to the ambient environment, the air compression system 30 can include a recapture line 106 that provides air back to the compressor 74 where it is re-compressed. The direction control valve 86 is configured to be a precision flow control component that regulates the direction of compressed air, enabling actuation of pneumatic devices by controlling flow paths and exhaust channels. In some embodiments, the air compression system 30 includes one or more sensors 108 that are each configured as a monitoring device, and information from the one or more sensors 108 can be received by the control system 12 and used by the control system 12 to trigger system actions based on predefined pressure thresholds, enabling automated control of the compressor and other system components.

Figure 6:
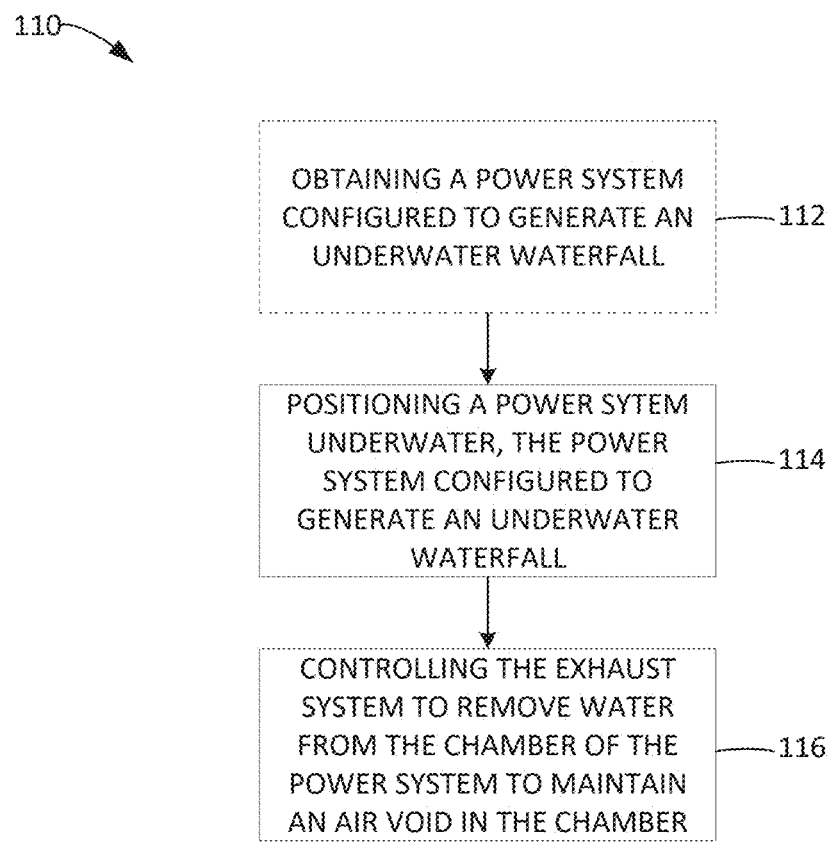
FIG. 6 illustrates an example of a process for generating hydroelectric energy from a hydroelectric system, for example, the system illustrated in FIGS. 1-3.

FIG. 6 illustrates an example of a process 110 for generating hydroelectric energy from a hydroelectric system, for example, the system illustrated in FIGS. 1-3. The process 110 can begin at block 114 with positioning a hydroelectric energy system underwater, the energy system configured to generate an underwater waterfall, the hydroelectric energy system including a turbine assembly having a proximal end and a distal end, the turbine assembly having a conduit having a fluid channel for communicating fluid extending between the proximal end and the distal end, and one or more hydroelectric turbines positioned within the conduit, the one or more turbines driven by water flowing through the conduit and into and through the turbine assembly, an intake manifold having one or more openings and coupled to the proximal end of the turbine assembly, the intake manifold structured to communicate fluid received through the one or more openings to the turbine assembly, a chamber coupled to the distal end of the turbine assembly, the chamber structured to receive water flowing through the turbine assembly, an exhaust system an exhaust system coupled to the chamber and in fluid communication with the chamber, the exhaust system comprising one or more discharge systems each having a cavity, the one or more discharge systems comprising a first discharge system including a first cavity, the first discharge system structured to receive water from the chamber into the first cavity and discharge the water, and a control system operatively connected to the exhaust system. The energy system is structured to be placed in an operating position underwater with the proximal end of the turbine assembly positioned higher than the distal end of the turbine assembly. The control system is configured to operate the exhaust system to remove water from the chamber at a first rate that is faster than, or equal to, a second rate of water flowing into the chamber from the turbine assembly. At block 116 the process 110 can further include controlling the exhaust system with the control system to remove water from the chamber to maintain an air void in the chamber causing the one or more turbines to spin and generate energy. In some embodiments, the process 110 can also include obtaining (or building) a hydroelectric energy system configured to generate an underwater waterfall.

Figure 7:
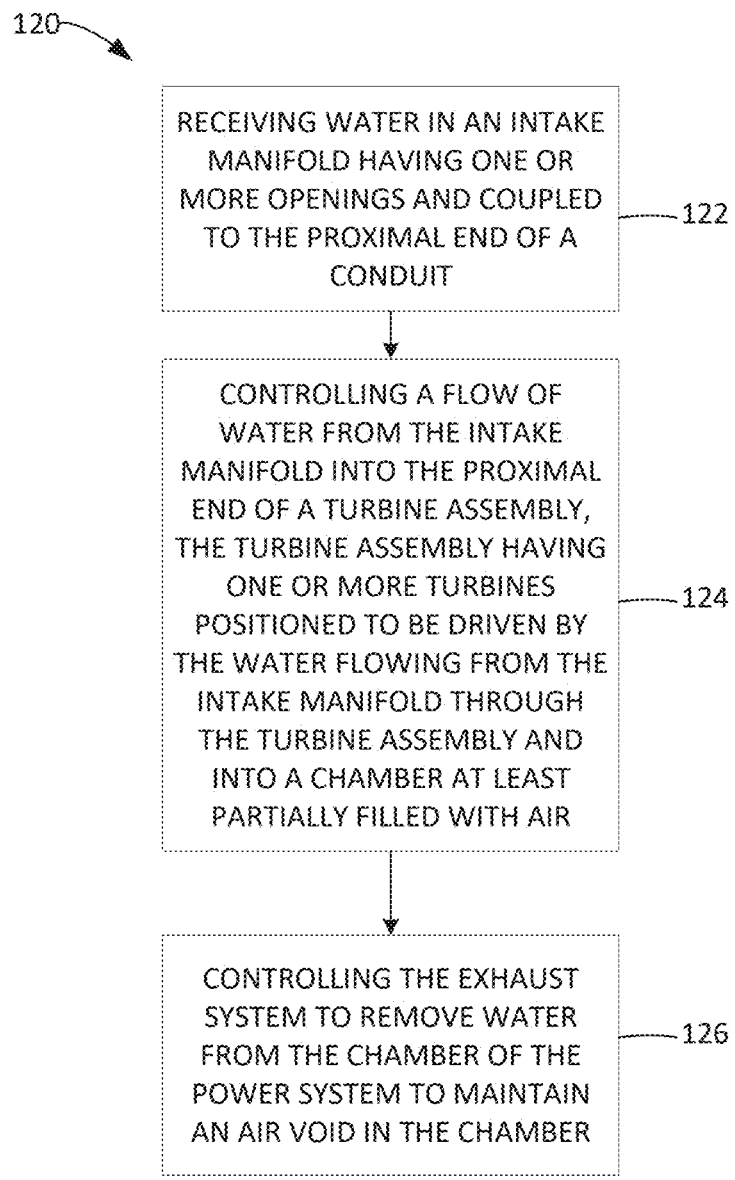
FIG. 7 illustrates another example of a process for generating hydroelectric energy from a hydroelectric system, for example, the system illustrated in FIGS. 1-3.

FIG. 7 illustrates another example of a process 120 for generating hydroelectric energy from a hydroelectric system, for example, the system illustrated in FIGS. 1-3. At block 122, the process 120 at block 122 includes receiving water in an intake manifold having one or more openings and coupled to the proximal end of a conduit. This can include positioning the intake manifold to receive the water. At block 124 the process 120 includes controlling a flow of water from the intake manifold into the proximal end of a turbine assembly, the turbine assembly having one or more turbines positioned to be driven by the water flowing from the intake manifold through the turbine assembly and into a chamber at least partially filled with air. At block 126 the process 120 includes controlling an exhaust system, coupled to the chamber and in fluid communication with the chamber, to remove water from the chamber to maintain an air void in the chamber. This can be done, for example, using one or more discharge systems of the exhaust system to remove water from the chamber at a rate that maintains air in the chamber.

Figure 8:
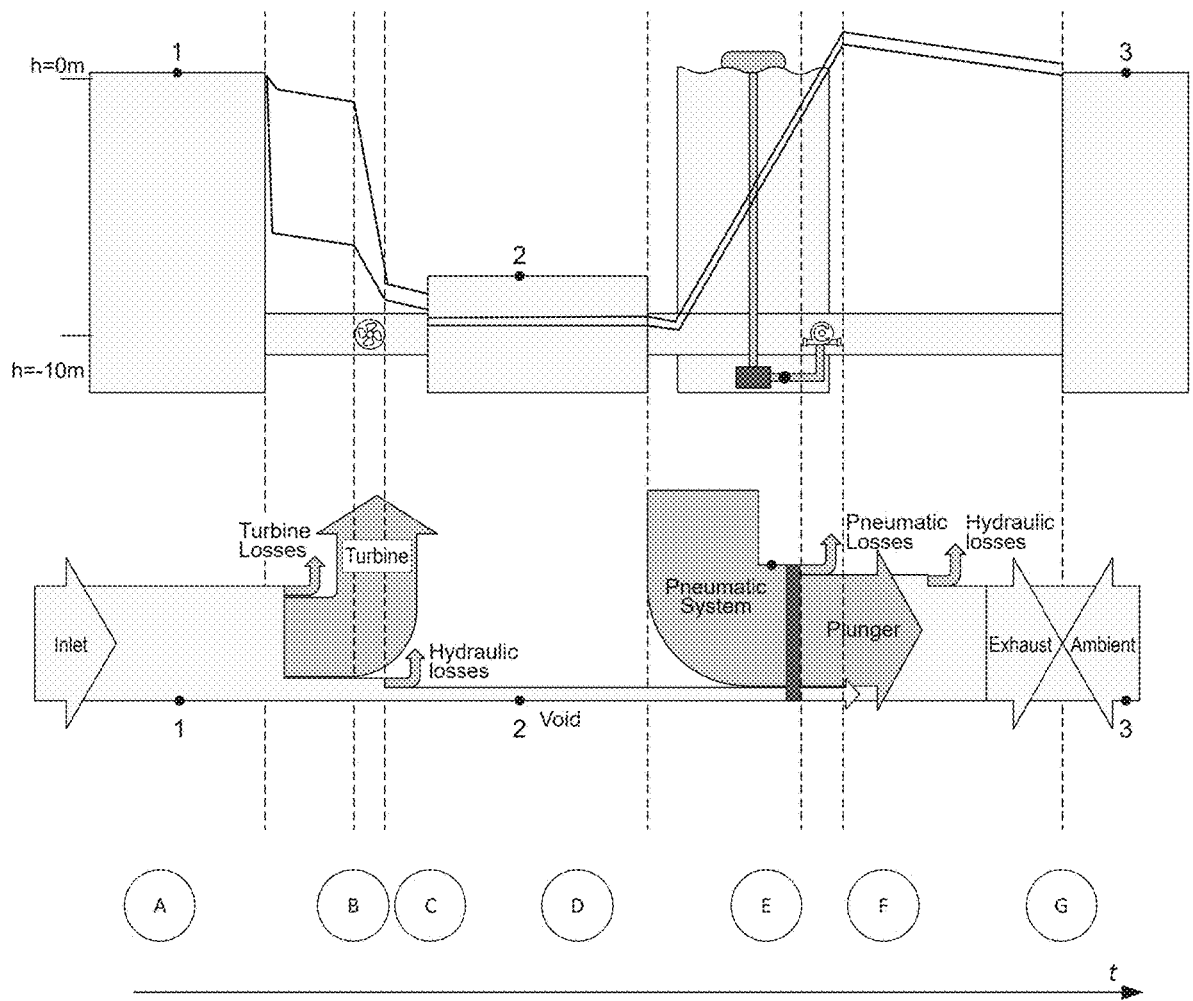
FIG. 8 illustrates an example of the physics of the process for generating hydroelectric energy from a hydroelectric system, for example, the system illustrated in FIGS. 1-3.

FIG. 8 is a schematic that illustrates example of certain portions of a process for generating hydroelectric energy from a hydroelectric system, for example, the system illustrated in FIGS. 1-3. The schematic follows water through the energy system at of the flow A-G, where the timeline is from left to right relative to the schematic, and indicates certain losses of energy that can be present in the process. Implementing innovation that minimize these losses can increase the energy generated by this energy system.

At portion A, water enters the energy system at an inlet manifold and flows down the conduit of the turbine assembly. In this example, the height of the column of water is about 10 meters. While there may be some loss of energy in the water flow due to friction between the water and the conduit, such losses are likely minimal. At portion B, water flows over a turbine where energy is generated. At portion C, losses from the turbine are present, for example, losses that may be attributed to friction and turbulence that occur as the water flows through the pipe and over the turbine. At portion D, water flows through the chamber (i.e., the void) and into the exhaust system. As described above, the exhaust system can include one or more discharge systems. Each of discharge system has a cavity for receiving water from the chamber and a means to remove the water from the cavity (for example, using a plunger mechanism, a piston mechanism, using compressed air to fill the cavity to force water out of the cavity, etc.). At portion E, utilizing a means for removing water from the cavity water of the discharge system is expelled from the cavity. In the example illustrated in FIG. 8, the exhaust system utilizes a pneumatic system powered by compressed air, which was generated from the ocean's natural wave motion, to expel water from the exhaust system. At this point of the process, energy losses from the pneumatic system are present. At portion F, hydraulic losses attributed to friction and turbulence occur at the water flows through the exhaust system in out of the exhaust system. Finally, at portion G, ambient pressure from the surrounding sea is overcome by the exhaust system as it provides the water back to the environment. Due to these losses, and other losses that may occur during operation to generate energy, optimizing the turbine design to maximize efficiency of the turbine and reduce friction, optimizing water flow paths through the turbine assembly in the exhaust system, and optimizing mechanisms of the exhaust system that remove water from the chamber can advantageously result in more efficient energy generation.

FIGS. 9A and 9B, and FIGS. 10A and 10B, are schematics of examples of mechanisms that can be used to expel water from an exhaust system. In some embodiments, similar mechanisms can be used to expel water directly from a chamber. For example, when the exhaust system is incorporated into the chamber (that is, when there is not a separate chamber and exhaust system cavity).

Figure 9A:
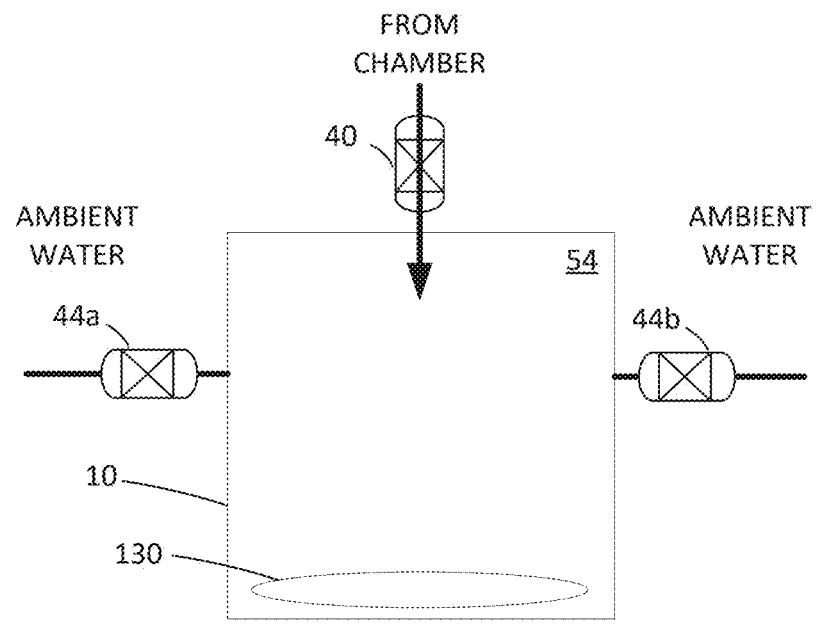
FIGS. 9A and 9B illustrate an embodiment of an exhaust system that uses an air-filled bladder to push water from a cavity in the exhaust system, where
Figure 9B:
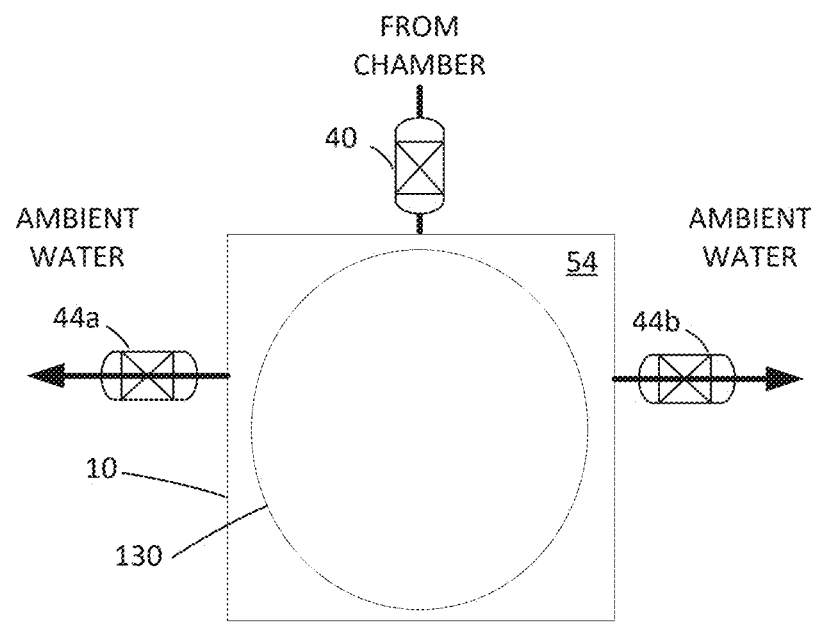

FIGS. 9A and 9B illustrate an embodiment of an exhaust system 10 that includes a bladder 130, and uses the bladder 130 to push water from a cavity 54 in the exhaust system 10. FIG. 9A illustrates a state of the exhaust system 10 where the exhaust system 10 is receiving water from a chamber (e.g., chamber 8, FIG. 1), the water from the chamber flowing into a cavity 54 of the exhaust system 10 and the bladder 130 is uninflated. In this state, the chamber to exhaust system valve 40 is open and water is flowing into the cavity 54, and the water exhaust valves 44a, 44b are closed. FIG. 9B illustrates a state of the exhaust system 10 where the bladder 130 is inflated and water is expelled from the cavity 54 of the exhaust system 10. In this state, the chamber to exhaust system valve 40 is closed, the water exhaust valves 44a, 44b are open, and the bladder 130 filled with a fluid to expand the bladder 130, and was it expands the bladder 130 expands displaces water in the cavity 54 and the displaced water flows out the exhaust valves 44a, 44b. In some embodiments, the bladder 130 is expanded by inflating the bladder 130 with air from an air compression system (e.g., the air compression system illustrated in FIG. 5). In other embodiments, the bladder 130 can be filled with water to expand the bladder 130.

Figure 10A:
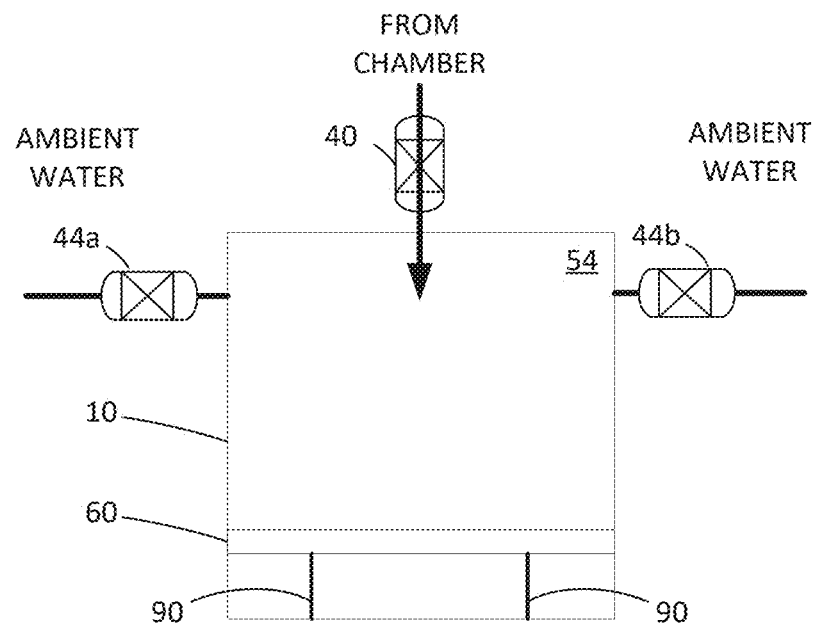
FIGS. 10A and 10B illustrate an embodiment of an exhaust system that uses a structure (or piston) moved by actuators (e.g., pneumatic actuators) to push water from a cavity in the exhaust system, where
Figure 10B:
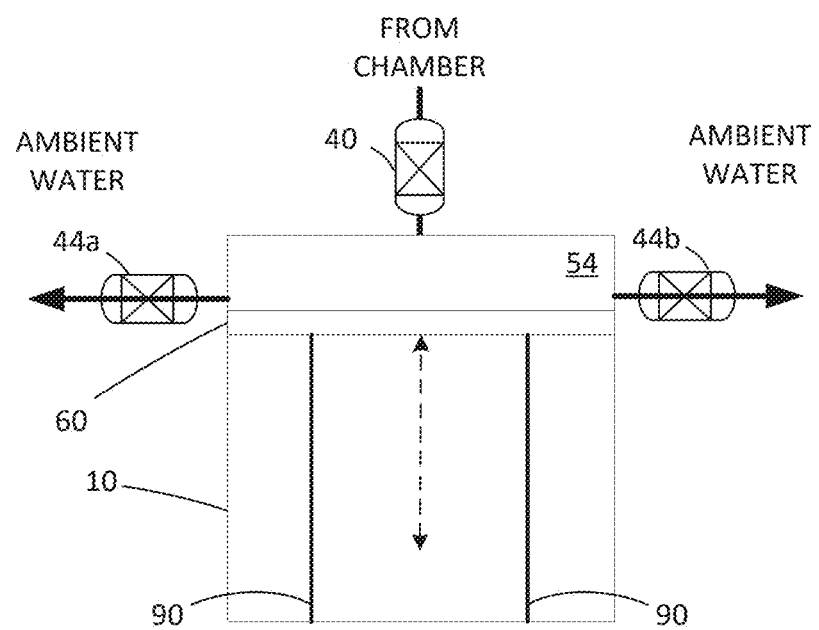

FIGS. 10A and 10B illustrate an embodiment of an exhaust system 10 that uses a structure (or piston) 60 moved by actuators (e.g., pneumatic actuators) 90 to push water from a cavity 54 in the exhaust system 10. FIG. 10A illustrates a state of the exhaust system 10 where the exhaust system 10 is receiving water from a chamber (e.g., chamber 8, FIG. 1), the water from the chamber flowing into a cavity 54 of the exhaust system 10 and the structure 60 is in an unactuated position. In this state, the chamber to exhaust system valve 40 is open and water is flowing into the cavity 54, and the water exhaust valves 44a, 44b are closed. FIG. 10B illustrates a state of the exhaust system 10 where the structure 60 is an actuated state and water is expelled from the cavity 54 of the exhaust system 10. In this state, the chamber to exhaust system valve 40 is closed, the water exhaust valves 44a, 44b are open. The structure 60 has been moved through the cavity 54 by the actuators 90, and as the structure 60 was moved through the cavity 54, it pushed water in the cavity 54 through the exhaust valves 44a, 44b.

Additional Embodiments

In embodiments of the present disclosure, an underwater turbine and method of operation and/or a system for generating electricity from an underwater ocean stream may be in accordance with any of the following clauses:

Clause 1. A system for generating hydroelectric energy underwater, comprising: a turbine assembly having a proximal end and a distal end, the turbine assembly comprising a conduit having a fluid channel for communicating fluid extending between the proximal end and the distal end, and one or more hydroelectric turbines positioned within the conduit, the one or more turbines driven by water flowing through the conduit and into and through the turbine assembly; an intake manifold having one or more openings and coupled to the proximal end of the turbine assembly, the intake manifold structured to communicate fluid received through the one or more openings to the turbine assembly; a chamber coupled to the distal end of the turbine assembly, the chamber structured to receive water flowing through the turbine assembly; and an exhaust system coupled to the chamber and in fluid communication with the chamber, the exhaust system comprising one or more discharge systems each having a cavity, the one or more discharge systems comprising a first discharge system including a first cavity, the first discharge system structured to receive water from the chamber into the first cavity and discharge the water; a control system operatively connected to the exhaust system, wherein the system is structured to be placed in an operating position underwater with the proximal end of the turbine assembly positioned higher than the distal end of the turbine assembly, and wherein the control system is configured to operate the exhaust system to remove water from the chamber at a first rate that is faster than, or equal to, a second rate of water flowing into the chamber from the turbine assembly.

Clause 2. The system of clause 1, wherein the one or more hydroelectric turbines are positioned at the distal end of the turbine assembly.

Clause 3. The system of clause1, wherein the one or more hydroelectric turbines comprises at least two hydroelectric turbines.

Clause 4. The system of clause 1, wherein the one or more discharge systems comprises a second discharge system having a second cavity, the second discharge system structured to receive water from the chamber into the second cavity and discharge the water.

Clause 5. The system of clause1, wherein the exhaust system further comprises a compressed air system for generating compressed air, and a plurality of channels and a plurality of valves arranged for providing the compressed air to operate the exhaust system.

Clause 6. The system of clause 5, wherein each of the one or more discharge systems includes a structure moveable in a first direction and a second direction within its cavity, and wherein the movement of the structure is actuated by the compressed air provided to the exhaust system.

Clause 7. The system of clause 5, wherein the compressed air system includes a compressor structured to be actuated by waves.

Clause 8. The system of clause 7, wherein the compressor includes a float intended to lie along the surface of a body of water and designed to generally move with the waves present in the water, air wherein the compressor is configured such that the movement of the structure by waves provides force to intake air and generate compressed air.

Clause 9. The system of clause 8, wherein the compressor comprises one or more pistons configured to generate compress air when the float moves in a first direction and a second direction.

Clause 10. The system of clause 8, wherein the compressed air system includes a compressed air storage tank in fluid communication with the compressor and the plurality of channels and valves.

Clause 11. The system of clause 10, wherein the compressed air tank is coupled to the exhaust system.

Clause 12. The system of clause 10, further comprising an air cooler positioned between the compressor and the air storage tank, the air cooler comprising a heat exchanger configured to reduce the temperature of compressed air flowing from the compressor to the air storage tank.

Clause 13. The system of clause 12, further including an air dryer positioned between the compressor and the air storage tank, the air dryer configured to remove moisture from the compressed air flowing from the compressor to the air storage tank.

Clause 14. The system of clause 13, wherein the air dryer is positioned between the air cooler and the air storage tank.

Clause 15. The system of clause 10, further comprising an air treatment system configured to condition the compressed air for downstream applications.

Clause 16. The system of clause 10, wherein the air treatment system is positioned between the air storage tank and a pneumatic actuator of the exhaust system.

Clause 17. The system of clause 16, wherein the air treatment system is configured to filter the compressed air.

Clause 18. The system of clause 16, wherein the air treatment system is configured to dry the compressed air.

Clause 19. The system of clause 16, wherein the air treatment system includes a pressure regulator configured to regulate the pressure of compressed air leaving the air treatment system.

Clause 20. The system of clause 19, wherein the control system is configured to control the pressure regulator.

Clause 21. The system of clause 20, wherein the control system is configured to control the pressure regulator to a predetermined level.

Clause 22. The system of clause 10, further comprising a direction control valve and a pneumatic actuator coupled to the direction control valve, wherein the direction control valve is configured to receive compressed air from the compress air storage tank and provide it to the pneumatic actuator to operate the pneumatic actuator, and the direction control valve is further configured to receive air from the pneumatic actuator and exhaust the air.

Clause 23. The system of clause 22, wherein the pneumatic actuator comprises a piston.

Clause 24. The system of clause 1, wherein the exhaust system comprises one or more discharge systems each having a cavity, the one or more discharge systems comprising a first discharge system including a first cavity, the first discharge system structured to receive water from the chamber into the first cavity and discharge the water.

Clause 25. The system of clause 24, wherein the one or more discharge systems comprises at least two discharge systems.

Clause 26. The system of clause 25, wherein the control system is configured to operate the at least two discharges systems to receive water from the chamber at least partially non-simultaneously for providing a substantially continuous flow of water from the chamber to the exhaust system.

Clause 27. The system of clause 25, wherein the at least two discharge systems comprises three or more discharge systems arranged around the chamber.

Clause 28. The system of clause 25, wherein the at least two discharge systems comprises six discharge systems arranged around the chamber.

Clause 29. The system of clause 24, wherein each of the one or more discharge systems includes a first valve between the chamber and the cavity of the respective discharge system, and a second valve between the cavity and the ambient environment of the discharge system, wherein the first valve and the second valve are operatively controlled by the control system to allow water to flow into the discharge system cavity and be exhausted out of the discharge system cavity.

Clause 30. The system of clause 29, wherein each of the one or more discharge systems further comprises a third valve between the chamber and the cavity of the respective discharge system, and a fourth valve between the cavity and the ambient environment of the discharge system, wherein the first, second, third, and fourth valves are operatively controlled by the control system to allow water to flow into the discharge system cavity via the first valve when water is being exhausted from the discharge system cavity via the second valve, and to allow water to flow into the discharge system cavity via the third valve when water is being exhausted from the discharge system cavity via the fourth valve.

Clause 31. The system of clause 1, wherein the turbine assembly comprises two or more turbines.

Clause 32. The system of clause 1, wherein the control system comprises a sensor for sensing flow of water through the turbine assembly, and the control system is configured to operate the exhaust system to remove water from the chamber to maintain the flow of water through the turbine assembly at a predetermined level.

Clause 33. A method of generating hydroelectric energy, comprising: positioning a hydroelectric energy system underwater, the hydroelectric system comprising: a turbine assembly having a proximal end and a distal end, the turbine assembly comprising a conduit having a fluid channel for communicating fluid extending between the proximal end and the distal end, and one or more hydroelectric turbines positioned within the conduit, the one or more turbines driven by water flowing through the conduit and into and through the turbine assembly; an intake manifold having one or more openings and coupled to the proximal end of the turbine assembly, the intake manifold structured to communicate fluid received through the one or more openings to the turbine assembly; a chamber coupled to the distal end of the turbine assembly, the chamber structured to receive water flowing through the turbine assembly; and the exhaust system comprising one or more discharge systems each having a cavity, the one or more discharge systems comprising a first discharge system including a first cavity, the first discharge system structured to receive water from the chamber into the first cavity and discharge the water; and a control system operatively connected to the exhaust system, wherein the system is structured to be placed in an operating position underwater with the proximal end of the turbine assembly positioned higher than the distal end of the turbine assembly, and wherein the control system is configured to operate the exhaust system to remove water from the chamber at a first rate that is faster than, or equal to, a second rate of water flowing into the chamber from the turbine assembly, and controlling the exhaust system with the control system to remove water from the chamber at a first rate that is faster than, or equal to, a second rate of water flowing into the chamber from the turbine assembly causing the one or more turbines to spin and generate energy.

Clause 34. A method of generating hydroelectric energy with a system positioned underwater, the method comprising: receiving water in an intake manifold having one or more openings and coupled to the proximal end of a conduit, controlling a flow of water from the intake manifold into the proximal end of a turbine assembly, the turbine assembly having one or more turbines positioned to be driven by the water flowing from the intake manifold through the turbine assembly and into a chamber; and controlling an exhaust system, coupled to the chamber and in fluid communication with the chamber, to remove water from the chamber at a first rate that is faster than, or equal to, a second rate of water flowing into the chamber.

Clause 35. A system for generating hydroelectric energy underwater, comprising: a turbine assembly comprising a conduit having a fluid channel for communicating fluid extending between the proximal end and the distal end, and a hydroelectric turbine positioned within the conduit, the hydroelectric turbines driven by water flowing through the conduit and into and through the turbine assembly; an intake manifold having an and coupled to the turbine assembly, the intake manifold structured to communicate fluid received through the opening to the turbine assembly; a chamber coupled to the turbine assembly, the chamber structured to receive water flowing through the turbine assembly; an exhaust system coupled to the chamber, the exhaust system structured to receive water from the chamber into the cavity and discharge the water; and a control system operatively connected to the exhaust system.

Clause 36. The system of claim 35, wherein the control system is configured to operate the exhaust system to remove water from the chamber at a first rate that is faster than, or equal to, a second rate of water flowing into the chamber from the turbine assembly.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the systems and methods of the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y. or Z. Thus, such conjunctive language is not generally intended to imply that certain embodiments require the presence of at least one of X, at least one of Y, and at least one of Z. Additionally, the phrase "based on" does not mean "based only on," unless expressly specified otherwise. In other words, the phrase "based on" describes both "based only on" and "based at least on." Unless otherwise explicitly stated, articles such as "a" or "an" should generally be interpreted to include one or more described items. Accordingly, phrases such as "a device configured to" are intended to include one or more recited devices.

Language of degree used herein, such as the terms "approximately," "about." "generally," and "substantially" as used herein represent a value, amount, or characteristic close to the stated value, amount, or characteristic that still performs a desired function or achieves a desired result. For example, the terms "approximately." "about." "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects, and advantages of the present invention, to which various changes and modifications can be made without departing from the spirit and scope of the present invention. Moreover, the devices described herein need not feature all of the objects, advantages, features, and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications, and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A system for generating hydroelectric energy underwater, comprising:
   a turbine assembly having a proximal end and a distal end, the turbine assembly comprising
      a conduit having a fluid channel for communicating fluid extending between the proximal end and the distal end, and
      one or more hydroelectric turbines positioned within the conduit, the one or more turbines driven by water flowing through the conduit and into and through the turbine assembly;
   an intake manifold having one or more openings and coupled to the proximal end of the turbine assembly, the intake manifold structured to communicate fluid received through the one or more openings to the turbine assembly;
   a chamber coupled to the distal end of the turbine assembly, the chamber structured to receive water flowing through the turbine assembly;
   an exhaust system coupled to the chamber and in fluid communication with the chamber, the exhaust system comprising one or more discharge systems each having a cavity, the one or more discharge systems comprising a first discharge system including a first cavity, the first discharge system structured to receive water from the chamber into the first cavity and discharge the water;
   a control system operatively connected to the exhaust system,
   wherein the system is structured to be placed in an operating position underwater with the proximal end of the turbine assembly positioned higher than the distal end of the turbine assembly, and
   wherein the control system is configured to operate the exhaust system to remove water from the chamber at a rate to maintain an air void in the chamber.

2. The system of claim 1, wherein the one or more hydroelectric turbines are positioned at the distal end of the turbine assembly.

3. The system of claim 1, wherein the one or more hydroelectric turbines comprises at least two hydroelectric turbines.

4. The system of claim 1, wherein the one or more discharge systems comprises a second discharge system having a second cavity, the second discharge system structured to receive water from the chamber into the second cavity, and discharge the water.

5. The system of claim 1, wherein the exhaust system further comprises a compressed air system for generating compressed air, and a plurality of channels and a plurality of valves arranged for providing the compressed air to operate the exhaust system.

6. The system of claim 5, wherein each of the one or more discharge systems includes a structure moveable in a first direction and a second direction within its cavity, and wherein the movement of the structure is actuated by the compressed air provided to the exhaust system.

7. The system of claim 5, wherein the compressed air system includes a compressor configured to be powered by waves.

8. The system of claim 7, wherein the compressor includes a float intended to lie along the surface of a body of water and designed to generally move with the waves present in the water, wherein the compressor is configured such that the movement of the structure by waves provides force to generate compressed air.

9. The system of claim 8, wherein the compressed air system includes a compressed air storage tank in fluid communication with the compressor and the plurality of channels and valves.

10. The system of claim 9, further comprising an air cooler positioned between the compressor and the air storage tank, the air cooler comprising a heat exchanger configured to reduce the temperature of compressed air flowing from the compressor to the air storage tank.

11. The system of claim 10, further including an air dryer positioned between the compressor and the air storage tank, the air dryer configured to remove moisture from the compressed air flowing from the compressor to the air storage tank.

12. The system of claim 9, further comprising an air treatment system configured to condition the compressed air for downstream applications.

13. The system of claim 12, wherein the air treatment system is configured to dry the compressed air.

14. The system of claim 12, wherein the air treatment system includes a pressure regulator configured to regulate the pressure of compressed air leaving the air treatment system, and wherein the control system is configured to control the pressure regulator.

15. The system of claim 9, further comprising a direction control valve and a pneumatic actuator coupled to the direction control valve, wherein the direction control valve is configured to receive compressed air from the compress air storage tank and provide it to the pneumatic actuator to operate the pneumatic actuator, and the direction control valve is further configured to receive air from the pneumatic actuator and exhaust the air.

16. The system of claim 1, wherein the one or more discharge systems comprise at least two discharge systems structured to receive water from the chamber and discharge the water.

17. The system of claim 16, wherein the control system is configured to operate the at least two discharges systems to receive water from the chamber at least partially non-simultaneously providing a substantially continuous flow of water from the chamber to the exhaust system.

18. The system of claim 1, wherein the control system comprises a sensor for sensing flow of water through the turbine assembly, and the control system is configured to operate the exhaust system to remove water from the chamber to maintain the flow of water through the turbine assembly at a predetermined level.

19. A method of generating hydroelectric energy, comprising:
positioning a hydroelectric energy system underwater, the hydroelectric system including
a turbine assembly having a proximal end and a distal end, the turbine assembly comprising
a conduit having a fluid channel for communicating fluid extending between the proximal end and the distal end, and
one or more hydroelectric turbines positioned within the conduit, the one or more turbines driven by water flowing through the conduit and into and through the turbine assembly;
an intake manifold having one or more openings and coupled to the proximal end of the turbine assembly, the intake manifold structured to communicate fluid received through the one or more openings to the turbine assembly
a chamber coupled to the distal end of the turbine assembly, the chamber structured to receive water flowing through the turbine assembly;
an exhaust system coupled to the chamber and in fluid communication with the chamber, the exhaust system comprising one or more discharge systems each having a cavity, the one or more discharge systems comprising a first discharge system including a first cavity, the first discharge system structured to receive water from the chamber into the first cavity and discharge the water; and
a control system operatively connected to the exhaust system, the control system configured to operate the exhaust system to remove water from the chamber at a first rate that is faster than, or equal to, a second rate of water flowing into the chamber from the turbine assembly,
wherein the system is structured to be placed in an operating position underwater with the proximal end of the turbine assembly positioned higher than the distal end of the turbine assembly, and
controlling the exhaust system with the control system to remove water from the chamber to maintain an air void in the chamber causing the one or more turbines to spin and generate energy.

20. A system for generating hydroelectric energy underwater, comprising:
a turbine assembly comprising a conduit having a fluid channel for communicating fluid extending between a proximal end and a distal end, and a hydroelectric turbine positioned within the conduit, the hydroelectric turbine driven by water flowing through the conduit and into and through the turbine assembly;
an intake manifold having an opening and coupled to the turbine assembly, the intake manifold structured to communicate fluid received through the opening to the turbine assembly;
a chamber coupled to the turbine assembly, the chamber structured to receive water flowing through the turbine assembly;
an exhaust system coupled to the chamber, the exhaust system structured to receive water from the chamber into a cavity and discharge the water; and
a control system operatively connected to the exhaust system, the control system configured to operate the exhaust system to remove water from the chamber at a first rate that is faster than, or equal to, a second rate of water flowing into the chamber from the turbine assembly maintain an air void in the chamber.

* * * * *